United States Patent
Mugu et al.

(10) Patent No.: US 12,137,055 B2
(45) Date of Patent: *Nov. 5, 2024

(54) VIRTUAL CHANNEL STARVATION-FREE ARBITRATION FOR SWITCHES

(71) Applicant: NVIDIA Corporation, Santa Clara, CA (US)

(72) Inventors: Anil Mugu, Kumble (IN); Srijith Haridas, Bangalore (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/375,265

(22) Filed: Sep. 29, 2023

(65) Prior Publication Data
US 2024/0031304 A1 Jan. 25, 2024

Related U.S. Application Data

(63) Continuation of application No. 17/508,356, filed on Oct. 22, 2021, now Pat. No. 11,824,791.

(30) Foreign Application Priority Data

Sep. 8, 2021 (IN) ............................. 202111040728

(51) Int. Cl.
*H04L 47/62* (2022.01)
*H04L 45/44* (2022.01)
*H04L 47/10* (2022.01)
*H04L 49/109* (2022.01)

(52) U.S. Cl.
CPC .......... *H04L 47/6225* (2013.01); *H04L 45/44* (2013.01); *H04L 47/39* (2013.01); *H04L 49/109* (2013.01)

(58) Field of Classification Search
None
See application file for complete search history.

(56) References Cited

U.S. PATENT DOCUMENTS

| | | | |
|---|---|---|---|
| 7,237,016 B1 | 6/2007 | Schober | |
| 7,969,971 B2* | 6/2011 | Gai | H04L 47/24 370/466 |
| 11,824,791 B2 | 11/2023 | Mugu et al. | |
| 2022/0191127 A1* | 6/2022 | Kopser | H04L 1/0083 |

OTHER PUBLICATIONS

"Changes and New Feature History," NVIDIA Corporation, 2021, 7 pages [retrieved online May 13, 2022 from: docs.nvidia.com/networking/m/view-rendered-page.action?abstractPageId=43718262].

(Continued)

*Primary Examiner* — Kouroush Mohebbi
(74) *Attorney, Agent, or Firm* — Sheridan Ross P.C.

(57) ABSTRACT

A switching system having input ports and output ports and comprising an input queued (IQ) switch with virtual channels. Typically, only one virtual channel can, at a given time, access a given output port. Typically, the IQ switch includes an arbiter apparatus that controls the input ports and output ports to ensure that an input port transmits at most one cell at a time, and/or that an output port receives a cell over only one virtual channel, and/or an output port receives at most one cell at a time.

20 Claims, 23 Drawing Sheets

(56) References Cited

OTHER PUBLICATIONS

"Crossbar switch," Wikipedia, last revised May 16, 2021, 7 pages [retrieved online May 13, 2022 from: https://en.wikipedia.org/w/index.php?title=Crossbar_switch&oldid=1023456895].

"What Is a Networking Switch Fabric?" SDxCentral Studios, Jun. 18, 2015, 8 pages [retrieved online May 13, 2022 from: www.sdxcentral.com/networking/sdn/definitions/enterprise-data-center-networking/what-is-network-fabric-definition/what-is-networking-switch-fabric/].

Blumrich et al. "Exploiting Idle Resources in a High-Radix Switch for Supplemental Storage," NVIDIA, Nov. 2018, 13 pages [retrieved online May 13, 2022 from: research.nvidia.com/sites/default/files/pubs/2018-11_Exploiting-Idle-Resources/Stashing_SC18.pdf].

Chandra et al. "Switch Arbitration Algorithms in High Speed Routers," Stanford, Last modified Jan. 2019, 9 pages [retrieved online May 13, 2022 from: cva.stanford.edu/classes/ee382c/ee482b/research/jhsu.pdf.

Dally "Virtual-Channel Flow Control," IEEE, 1990 Proceedings of The 17th Annual International Symposium on Computer Architecture, May 1990, pp. 60-68.

Dally "Virtual-Channel Flow Control," IEEE Transactions on Parallel and Distributed Systems, Mar. 1992, vol. 3, No. 2, pp. 194-205.

Kavaldjiev "A Virtual Channel Router for On-chip Networks," IEEE, IEEE International SOC Conference, 2004: Proceedings, pp. 289-293.

Mckeown "The iSLIP Scheduling Algorithm for Input-Queued Switches," IEEE/ACM Transactions on Networking, Apr. 1999, vol. 7, No. 2, pp. 188-201.

Olesinski et al. "Scalable Alternatives to Virtual Output Queuing," Proceedings of IEEE International Conference on Communications, ICC 2009, Jun. 2009, 7 pages.

Wang et al. "Design of a Crosspoint Queued router for a micro-network in SoCs," IEEE, 2011 3rd International Conference on Advanced Computer Control, Jan. 2011, 5 pages (abstract only).

Official Action for U.S. Appl. No. 17/508,356, dated Dec. 23, 2022, 18 pages.

Notice of Allowance for U.S. Appl. No. 17/508,356, dated Jul. 6, 2023, 11 pages.

* cited by examiner

| Crediting scheme | RTT | MTU | Ready queue depth | Extra credit | Total credit /VC/Destination | Total credit or Buffer Size |
|---|---|---|---|---|---|---|
| Pre creditor | 10 | 5 | 1 | 25 | 41 | 492 |
| Credit at dispatch | 10 | 5 | 0 | 0 | 15 | 180 |

Fig. 21

VIRTUAL CHANNEL STARVATION-FREE ARBITRATION FOR SWITCHES

CROSS-REFERENCE TO RELATED APPLICATIONS

This application is a continuation of U.S. patent application Ser. No. 17/508,356 filed Oct. 22, 2021, which claims the benefit of India Patent Application No. 202111040728 filed Sep. 8, 2021, the disclosures of each of which are incorporated herein by reference in their entirety.

FIELD

This invention relates generally to switches, and more specifically to graphics processing unit (GPU) switching systems.

BACKGROUND

The switching fabric is the basic topology of how a network is laid out and connected to switch traffic on a data or circuit-switched network. The term "fabric" comes from the crisscross nature of a networking fabric, which is often visualized as a checkerboard of connections. Switch architecture defines the internal organization and functionality of a switch or router. Basically, a switch has a set of input ports where data messages come in and a set of output ports where data messages are delivered. A scheduling algorithm is used to configure the switch, deciding the order in which packets will be served.

A switch/router may use a switched backplane based on a crossbar switch. A crossbar switch is a collection of switches arranged in a matrix configuration. A crossbar switch has multiple input and output lines that form a crossed pattern of interconnecting lines between which a connection may be established by closing a switch located at each intersection. Most often, these systems use input queues (IQs) to hold packets waiting to traverse the switching fabric.

SUMMARY OF THE DISCLOSURE

A system on a chip (SoC) is an integrated circuit (IC) that integrates components of a computer or system into a single substrate or microchip. The integrated components may include an on-chip central processing unit (CPU), memory interfaces, input/output (I/O) devices and interfaces, graphics processing unit (GPU), general purpose processor (GPP), digital signal processor (DSP), Field Programmable Gate Array (FPGA), application-specific integrated circuit (ASIC), etc. The integrated components on a SoC are interconnected through a packet-switched on-chip network (NoC).

Network performance may be improved by lowering latency and increasing throughput. One way to increase network throughput is by dividing the buffer storage associated with each network channel (e.g., port) into several virtual channels so that each physical channel is associated with several small queues (e.g., a queue for each virtual channel), rather than a single large queue. The virtual channels associated with a physical channel are allocated independently, but compete with each other for physical bandwidth. In other words, virtual channels decouple buffer resources from transmission resources. A virtual channel may consist of a buffer (e.g., a portion of the buffer associated with a physical channel) that holds packets and associated state information.

For example, in a switch, each input port may have (v) virtual channels that are each demultiplexed and buffered into input queues (e.g., a first in first out (FIFO) queue). State information is kept for each virtual channel. Virtual channels may have the following states: (1) Idle—after initialization, but before the virtual channel receives packet; (2) Busy—a packet is using the virtual channel; (3) Empty—busy virtual channel with empty input queue; and (4) Ready—busy virtual channel with a non-empty input queue. Rather than multiplexing each virtual channel after buffering them into input queues, the virtual channels may be directly connected to a crossbar.

In order to forward a packet, the switch/router needs information regarding the output port (p) the packet is to go to; and the virtual channel (v) of the output port the packet is sent on. In source routing where the route of a packet is predetermined and described in the packet header, values for (p) and (v) are included in the packet header. After the (p) and (v) values are obtained, the packet's input virtual channel starts competing for a crossbar connection to the output port (p).

An arbiter controls the operation of the switch/router and determines on a cycle-by-cycle basis which "ready" input virtual channel may advance (e.g., use a output port). The main task of the arbiter is to resolve possible conflicts between virtual channels. For each cycle, only one input virtual channel may advance, and an output port can accept data (e.g., a packet) from only one input virtual channel. Two goals of the arbitration unit/scheme is to give equal chances to all competing input virtual channels (e.g., fairness), and high network throughput (e.g., performance). These two goals may be at odds since traffic patterns that maximize throughput can only be achieved if fairness is sacrificed.

It is well known that if simple first in first out (FIFO) input queues are used to hold packets then, even under benign conditions, head-of-line (HOL) blocking limits the achievable bandwidth to approximately 58.6% of the maximum. To avoid HOL blocking in switches, virtual output queues (VOQs) are commonly used. With VOQs, rather than keeping all traffic in a single queue, separate queues are maintained for each possible output location. With VOQs, the physical buffer of each input port maintains a separate virtual queue for each output port. Therefore, congestion on an egress port will block only the virtual queue for this particular egress port. Other packets in the same physical buffer destined to different (non-congested) output ports are in other separate virtual output queues, and can therefore still be processed. Without virtual output queues, the blocked packet for the congested egress port would block the whole physical buffer, resulting in HOL blocking.

Flow controls are used to prevent packet drops within switches. Flow control deals with the allocation of channel and buffer resources to a packet as it traverses its route, and how packet collisions over resources are resolved (e.g., several input virtual channels sharing an output virtual channel). In credit-based flow control, packets are dispatched to a destination, if the destination is guaranteed to have space or credit to accommodate the packet.

General purpose switches with symmetric ports use the same sized buffer for all switch ports, and buffers must be sized for the longest links, this results in buffer resource underutilization when the general-purpose switch is deployed in an asymmetric network with a wide range of link lengths. Using a VOQ switch architecture, ports may "stash" packets in the unused buffers on other ports. In other words, idle resources may be exploited for supplemental storage. Stashing can be used to implement a variety of network features.

A scheduling algorithm provides a high-speed mapping of packets from input ports to output ports on a cycle-to-cycle basis. A good scheduling algorithm is an important component of any network.

The Parallel Iterative Matching (PIM) scheduling algorithm works as follows: (1) Request—Every unmatched input sends a request to every output for which it has a queued cell; (2) Grant—Among all received requests, an unmatched output chooses one randomly with equal probability; and (3) Accept—Each unmatched input, then, randomly accepts one granted request with equal probability. The randomness in choosing the grant in step 2 ensures that the algorithm will converge, and that no input-output flow is starved. Each iteration of the PIM algorithm eliminates at least ¾ of the remaining possible flows, and this is why it converges so quickly.

The iSLIP (iterative round robin matching with slip) scheduling algorithm uses rotating priority arbitration to schedule each active input and output in turn. The arbitration is carried out in three steps for each iteration. The main characteristics of iSLIP are: high throughput, starvation free, fast and simple to implementation. The iSLIP arbitration can be briefly described as follows: Step 1 (Request)—Every unmatched input sends a request to every output for which it has a queued cell; Step 2 (Grant)—If an unmatched output receives any requests, it chooses the one that appears next in a fixed round-robin schedule starting from the highest priority element. The output notifies each input whether or not its request was granted. The pointer g, to the highest priority element of the round-robin schedule is incremented to one location beyond the granted input if the grant is accepted in step 3 of the first iteration. The pointer is not incremented in subsequent iterations; Step 3 (Accept)—If an input receives a grant, it accepts the one that appears next in a fixed round-robin schedule. The pointer a, to the highest priority element of the round-robin schedule is incremented to one location beyond the accepted output.

The main properties of the iSLIP scheduling algorithms are: (1) flows matched in the first iteration become the lowest priority in the next cell time; (2) flows aren't starved, because of the requirement that pointers aren't updated after the first iteration—the output will continue to grant to the highest priority requesting input until it is successful; (3) the algorithm will converge in at most N iterations (one to every input and one every output)—each iteration will schedule zero, one or more flows; (4) the high performance of iSLIP is a consequence of step 2, because the output arbiter is updated if there is a successful match in step 3. Moving the pointers not only prevents starvation, but it tends to desynchronise the grant arbiters. This de-synchronization of the grant arbiters results in 100% throughput in an input-queued (IQ) switch for uniform traffic. When the traffic is nonuniform, iSLIP quickly adapts to a fair scheduling policy that is guaranteed never to starve an input queue.

In a case where an output port is shared among several input virtual channels, the system must arbitrate between all the input virtual channels using the same output port and allow only one input virtual channel access to the output port per cycle. To handle the arbitration, virtual channel states (5) hold; and (6) virtual channel is busy (vcb); are added. The vcb signal shows whether the desired/selected output port is busy or not, an input virtual channel activates the hold signal when it obtains the selected output port. After the packet is sent, the input virtual channel goes to an idle state and deactivates the hold signal, which releases the output port.

Embodiments of the present disclosure seek to provide practical high-performance systems, by providing a scheduling algorithm with all or any appropriate subset of the following properties.

High Throughput: An algorithm that keeps the backlog low in the Virtual Output Queues (VOQ); ideally, the algorithm will sustain an offered load up to 100% on each input port and output port; and/or Starvation Free: The algorithm typically does not allow a non-empty VOQ to remain unserved indefinitely; and/or Fast: To achieve the highest bandwidth switch, it is desired that the scheduling algorithm does not become the performance bottleneck; the algorithm therefore typically finds a match as quickly as possible; and/or Convenient to Implement: The algorithm may be implemented in special-purpose hardware, preferably within a single chip.

Embodiments of the present disclosure seek to provide virtual channel (VC) Round Robin (RR)—Least Recently Used (LRU) iSLIP arbitration, which is starvation free. An arbiter apparatus uses an RR-LRU arbitration scheme to make connections, over which at least one packet is transmitted through a switch, between input and output ports. In the RR-LRU arbitration scheme, a first set of arbiters uses a Round Robin (RR) arbitration scheme and a second set of arbiters uses a Least Recently Used (LRU) scheme.

Embodiments of the present disclosure seek to provide virtual channel specific round robin arbiters such that when credit of any virtual channel runs out, a credit-at-dispatch scheme may mask all requests to that virtual channel's specific round robin arbiter whose round robin pointer may be stuck (frozen), until credit is returned to that virtual channel. The credit-at-dispatch request masking ensures that no virtual channel's requests remain unserved indefinitely.

Embodiments seek to provide an arbiter apparatus serving an input queued switch typically having a plurality of input ports and/or a plurality of output ports and/or a plurality of virtual channels and/or a credit-based flow control, which typically ensures that at least one, or typically every one of the plurality of input ports, transmits at most one cell at a time, and/or ensures that at least one, or typically every one of, the plurality of output ports, receives at most one cell at a time and/or ensures that at least one (typically each) output port, from among the plurality of output ports, receives a cell over only one virtual channel (from among the plurality of virtual channels) at a time, thereby to function as a dispatch unit.

At least the following embodiments are included in the scope of the present invention:

Embodiment 1. A switching system having a plurality of input ports and a plurality of output ports and comprising: an input queued switch with a plurality of virtual channels, only one of which can, at a given time, access a given output port from among the plurality of output ports, wherein the input queued switch includes an arbiter apparatus which controls the plurality of input ports and plurality of output ports to ensure that at least one input port, from among the plurality of input ports, transmits at most one cell at a time, and also that at least one output port, from among the plurality of output ports, which receives a cell, receives that cell over only one virtual channel from among the plurality of virtual channels, and wherein the at least one output port, from among the plurality of output ports, receives at most one cell at a time.

Embodiment 2. A system according to any preceding embodiment wherein the arbiter apparatus comprises:
- a first set of arbiters which selects, for at least one output port O, at least one input port from among the plurality of input ports; and
- at least one virtual channel from among the plurality of virtual channels characterized in that the at least one input port has at least one queued cell, whose destination is output port O, in each of the at least one virtual channel, and
- a second set of arbiters, which selects, for each input port I from among the plurality of input ports, at least one output port O, from among the plurality of output ports, characterized in that the first set of arbiters selected input port I for output port O.

Embodiment 3. A system according to any preceding embodiment wherein the first set of arbiters includes, for each of the plurality of output ports, a subset of arbiters (DV arbiters) to select, at least once, an input port I from among the plurality of input ports which is requesting that output port as the input port I's destination and a virtual channel V from among the plurality of virtual channels which is requesting that output port as the virtual channel V's destination, thereby to provide a plurality of subsets of arbiters.

Embodiment 4. A system according to any preceding embodiment wherein the at least one subset of arbiters includes an arbiter for each virtual channel.

Embodiment 5. A system according to any preceding embodiment wherein the at least one subset of arbiters also includes virtual channel select logic to select among the plurality of arbiters.

Embodiment 6. A system according to any preceding embodiment wherein a plurality of requests on a single virtual channel whose destinations all comprise a single output port, are all connected to a single DV arbiter in a single subset of arbiters, whereas requests on different virtual channels, whose destinations all comprise a single output port, are connected to different DV arbiters in a single subset of arbiters.

Embodiment 7. A system according to any preceding embodiment wherein at least one DV arbiter uses an arbitration scheme to select among the plurality of input ports, and wherein the arbitration scheme used by the DV arbiter comprises a round robin scheme which uses circular priority to grant requests.

Embodiment 8. A system according to any preceding embodiment wherein the DV arbiter updates the circular priority only after receiving an accept, from the second set of arbiters, through the virtual channel select logic.

Embodiment 9. A system according to any preceding embodiment wherein the virtual channel select logic uses an arbitration scheme to select a DV arbiter to pass a granted input port, from among the plurality of input ports, to the second set of arbiters, which each have that granted input port.

Embodiment 10. A system according to any preceding embodiment wherein the arbitration scheme used by the virtual channel select logic comprises a round robin arbitration scheme.

Embodiment 11. A system according to any preceding embodiment wherein the DV arbiter selected by the virtual channel select logic generates a WRAP signal when all active input ports in that DV arbiter are granted or before again granting an input port.

Embodiment 12. A system according to any preceding embodiment wherein once the virtual channel select logic has selected a DV arbiter, thereby to define a currently selected DV arbiter, the virtual channel select logic moves to a new DV arbiter only after receiving a WRAP signal from the currently selected DV arbiter.

Embodiment 13. A system according to any preceding embodiment wherein the virtual channel select logic passes an accept to a selected DV arbiter, when and only when the second set of arbiters accepts a grant from the first set of arbiters.

Embodiment 14. A system according to any preceding embodiment wherein at least one arbiter in the second set of arbiters uses a priority scheme in which a request, which has a given priority, receives a grant before other requests, which have priorities lower than the given priority, receive grants.

Embodiment 15. A system according to any preceding embodiment wherein the switch uses credit-based flow control, whereby packets are transmitted to an output port, from among the plurality of output ports, only when buffer space is known to exist at a destination of the output port, to avoid packet drop in at least one switch.

Embodiment 16. A system according to any preceding embodiment wherein[[,]] to support the credit-based flow control, the input queued switch maintains a counter for every destination per virtual channel, wherein each counter keeps track of buffer space per destination by decrementing an associated counter for every packet sent to a given destination and incrementing the associated counter for every credit returned from the given destination, and wherein credits are returned from a destination D from among the plurality of output ports, whenever a destination buffer at the destination D is freed up.

Embodiment 17. A system according to any preceding embodiment wherein Virtual Output Queues (VOQ) store incoming packets, wherein each destination's 'counter generates a ready indication whenever a given destination and a given virtual channel have enough credit to accommodate a packet, and wherein, when the ready indication is asserted, requests to transmit packets through the input queued switch in all input ports' VOQ of the destination and virtual channel are exposed to the dispatch unit, else all requests to transmit packets through the switch are masked, thereby to provide a "credit at dispatch" scheme of credit-based flow control.

Embodiment 18. A switching method comprising:
- providing an input queued switch with a plurality of virtual channels, only one of which can, at a given time, access a given output port from among a plurality of output ports; and
- using an arbiter apparatus to control a plurality of input ports and the plurality of output ports, to ensure that each input port, from among the plurality of input ports, transmits at most one cell at a time, and also that each output port, from among the plurality of output ports, which receives a cell, receives that cell over only one virtual channel from among the plurality of virtual channels, and each output port, from among the plurality of output ports, receives at most one cell at a time.

Embodiment 19. A system according to any preceding embodiment wherein the system has N inputs ports, M outputs ports, and K virtual channels, and wherein the arbiter apparatus finds a set of up to min (M,N) cells to transmit over the input queued switch.

Embodiment 20. A system according to any preceding embodiment, wherein the priority scheme comprises a round robin scheme.

Embodiment 21. A system according to any preceding embodiment, wherein the priority scheme comprises a Least Recently Used (LRU) scheme in which at least one request which got a grant less recently, has higher priority relative to requests which got grants more recently.

Embodiment 22. A system according to any preceding embodiment wherein[[,]] to support the credit-based flow control, the input queued switch maintains a counter for every destination per virtual channel, wherein each counter keeps track of buffer space per destination by incrementing the associated counter for every packet sent to a given destination, and decrementing the associated counter for every credit returned from the given destination, and wherein credits are returned from a destination D from among the plurality of output ports, whenever a destination buffer at the destination D is freed up.

Embodiment 23. A system according to any preceding embodiment wherein the virtual channel select logic does not pass the given virtual channel's arbiter's grants when the ready indication is not high.

Embodiment 24. A system according to any preceding embodiment wherein the arbiter does not grant inputs when the ready indication is not high.

Embodiment 25. A system according to any preceding embodiment wherein the associated counter is incremented each time a packet is sent to the given destination and is decremented each time a credit returns from the given destination.

Embodiment 26. A system according to any preceding embodiment wherein at least one arbiter, corresponding to a source S, in the second set of arbiters, uses a priority scheme to accept at least one grant, from among a plurality of grants to source S.

Embodiment 27. A system according to any preceding embodiment wherein at least one arbiter in the second set of arbiters uses a priority scheme to accept a grant from among the plurality of grants of to this source S.

Embodiment 28. A system according to any preceding embodiment wherein the arbiter apparatus ensures that each input port, from among the plurality of input ports, transmits at most one cell at a time, and also that each output port, from among the plurality of output ports, which receives a cell, receives that cell over only one virtual channel from among the plurality of virtual channels, and wherein each output port, from among the plurality of output ports, receives at most one cell at a time.

Embodiment 29. A switching method comprising, in an input queued switch with a plurality of virtual channels, only one of which can, at a given time, access a given output port from among a plurality of output ports:
controlling a plurality of input ports and the plurality of output ports, to ensure that at least one input port, from among the plurality of input ports, transmits at most one cell at a time, and also that at least one output port, from among the plurality of output ports, which receives a cell, receives that cell over only one virtual channel from among the plurality of virtual channels, whereby at least one output port, from among the plurality of output ports, receives at most one cell at a time.

The following terms may be construed either in accordance with any appropriate definition thereof appearing in literature in the relevant field of technology or in accordance with the specification, or to include in their respective scopes, the following:

Arbiters (ARBs): include electronic devices that allocate access to shared resources. Arbiters mentioned herein may comprise synchronous arbiters. Typically, each arbiter herein is a 2D arbiter aka "2D ARB."

Arbitration scheme: includes any scheme that determines the efficiency of a network device (e.g., a crossbar switch). Commonly used arbitration schemes include Round Robin (RR) and Least Recently Used (LRU).

VOQ arbitration: includes scheduling of virtual output queues—typically including resolving multiple concurrent access wishes.

Space: includes availability of a resource.

Area: includes a Si (silicon) area where a given resource may be implemented in a given design.

Credit: includes an available resource at a given space.

Destination Choose Source (DCS) set or DCS: includes a first set of arbiters that selects at least one source and at least one virtual channel requesting at least one destination.

Source Choose Destination (SCD) set or SCD: includes a second set of arbiters that typically selects among destinations that have selected at least one source.

Destination DCS: a subset of arbiters, for each of multiple destinations, which may select, at least once, a source from among sources requesting that destination and a virtual channel from among virtual channels requesting that destination. Typically, there are multiple subsets of arbiters, thus multiple destination DCSs.

Credit counter: include a counter that supports the credit-based flow control, for every destination per virtual channel. Credit counters may be per destination per virtual channel and may mask/unmask requests in corresponding virtual channels corresponding to a destination VOQ.

"In conventional nomenclature for iSLIP arbitration schemes, the Destination Choose Source (DCS) arbitration scheme precedes the Source Choose Destination (SCD) arbitration scheme. For example, |RR-LRU iSLIP means the DCS has a round robin (RR) arbitration scheme whereas the SCD has a Least Recently Used (LRU) arbitration scheme. It is appreciated that the LRU-LRU iSLIP arbitration scheme suffers from severe performance loss hence is from that point of view at least, undesirable compared to the RR-LRU iSLIP arbitration scheme on which embodiments herein are focused.

A "request" (e.g., a request to transmit packets through a switch, or a virtual channel "requesting" a destination) occurs during a "request" stage in which each input port sends a request to at least one (typically each) output port O for which that input port has at least one queued cell whose destination is O. According to certain embodiments, the virtual channel of each input port sends a request to at least one (typically each) output port O for which that virtual channel has at least one queued cell whose destination is O.

A request is "active" when, for a given destination and a given virtual channel, the request is waiting to be served or dispatched (as opposed to a request which has already been dispatched which is no longer "active."

Cell: include portions of a packet; cells are the granularity at which a switching system works.

Circular priority: meaning requests are granted starting from the request adjacent or next to or coming after the most recently granted request.

"Pre-creditor" crediting scheme: " " " " " " meaning credit-based flow control is supported by crediting incoming requests in VOQs and placing the incoming requests in a ready queue by deducting credit from a credit counter.

"Credit at dispatch": includes a scheme in which credit counter/s generates a "ready" indication whenever a given destination has enough credit to accommodate a request. Only when "ready" is asserted, are requests from sources exposed to a dispatch unit.

Dispatcher: includes a scheduler comprising a scheduling algorithm running on a hardware processor, or a 2D ARB as described herein. The dispatcher may, in addition to the scheduler, include a fabric (matrix) unit (e.g. as shown in FIG. 1).

Performance: includes a rate at which packet transmission occurs in a given switching system.

WRAP: includes an indication from an arbiter that all active requests have been granted at least once since the beginning of a current arbitration window.

"Arbitration window: includes a duration of time that elapses between wrap assertions or from reset to a first wrap assertion.

The terms "scheduler," "dispatcher," "dispatch switch," "arbiter," and "dispatcher unit" may be interchanged herein.

"Input queued (IQ) switch:" includes an input queue and/or a dispatcher or dispatch unit which typically includes an arbiter and/or fabric/matrix, as shown in FIG. 1. A credit flow control block may be provided which may be needed only in a credit-based flow control use-case.

The terms "input," "input port," and "source" may be interchanged herein.

Also, the terms "output," "output port,", and "destination" may be interchanged herein.

The terms "space," "area," and "credit" may be interchanged herein.

BRIEF DESCRIPTION OF THE DRAWINGS

FIG. 21 is a table comparing total credits between a pre-creditor scheme vs. a "credit at dispatch" scheme, which is useful in understanding the present disclosure.

DETAILED DESCRIPTION OF CERTAIN EMBODIMENTS

Figure 9:
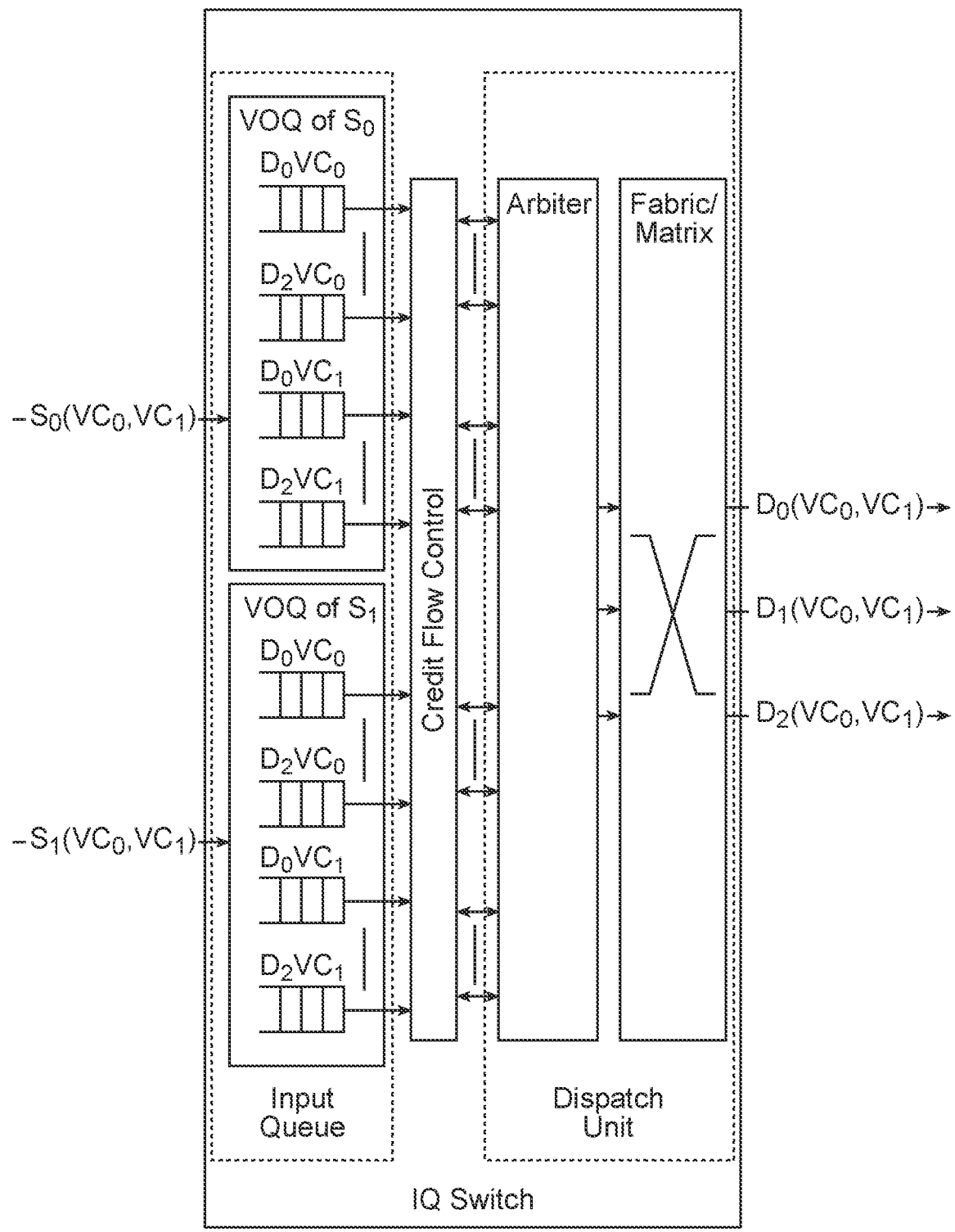
FIG. 9 is a simplified block diagram illustration of a 2×3 switch with two virtual channels, all provided in accordance with the present disclosure.

A switching system is now described, (e.g., as shown in FIG. 9). The switching system may have a plurality of input ports and a plurality of output ports and may include an input queued (IQ) switch with a plurality of virtual channels. Typically only one of the virtual channels can, at a given time, access a given output port from among the plurality output ports.

Typically, the IQ switch includes an arbiter which controls the plurality of input ports and the plurality of output ports to ensure that each input port transmits at most one cell at a time, and also that each output port which receives a cell, receives that cell over only one of the switch's virtual channels. The arbiter apparatus typically functions as a dispatch unit in which each output port, from among the plurality of output ports, receives at most one cell at a time.

Referring now to FIG. 9's fabric (matrix) unit, typically, each input port is uniquely connected to each output port through a dedicated crosspoint or junction. The resulting set of cross points or junctions, for all input and output ports, may be referred to using the term "Fabric," "Switch fabric," or "Matrix." Packets may be transferred between a given input port and a given output port by selecting the cross point that uniquely connects that input port to that output port. This cross point selection is typically carried out by the arbiter.

The credit flow control block of FIG. 9, may be implemented in hardware and may run a "credit at dispatch" or "pre-creditor" scheme, or any other appropriate scheme having logic for assigning credits to virtual channels and for incrementing or decrementing those credits under certain conditions. The credit flow control block's exercise of flow control typically comprises allowing a packet for arbitration only if the packet's destination is guaranteed to have space or credit to accommodate the packet.

Figure 1:
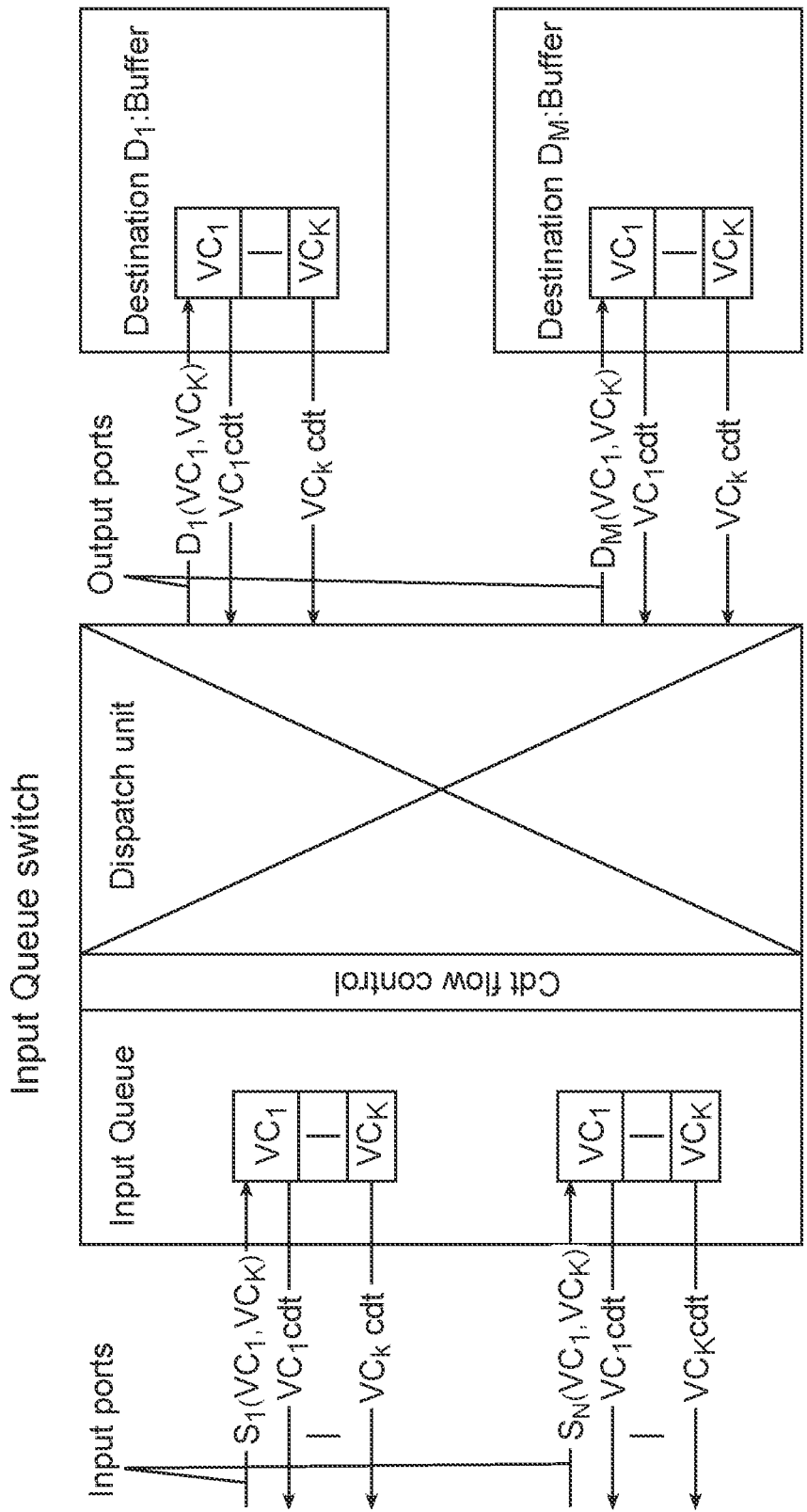
FIG. 1 is a simplified block diagram illustration of an input queued (IQ) switch and associated input ports, output ports, and destination buffers, all provided in accordance with the present disclosure. Typically, a given output port is connected to only one destination. This is typically the case for all of the output ports in the switch. Typically, destinations buffer space are not shared among output ports.

The Input Queued (IQ) switch architecture, (e.g. as shown in FIG. 1) is commonly used in high-speed switches. FIG. 1 is a simplified block diagram illustration of an IQ switch along with input ports, output ports and destination buffers.

Figure 2:
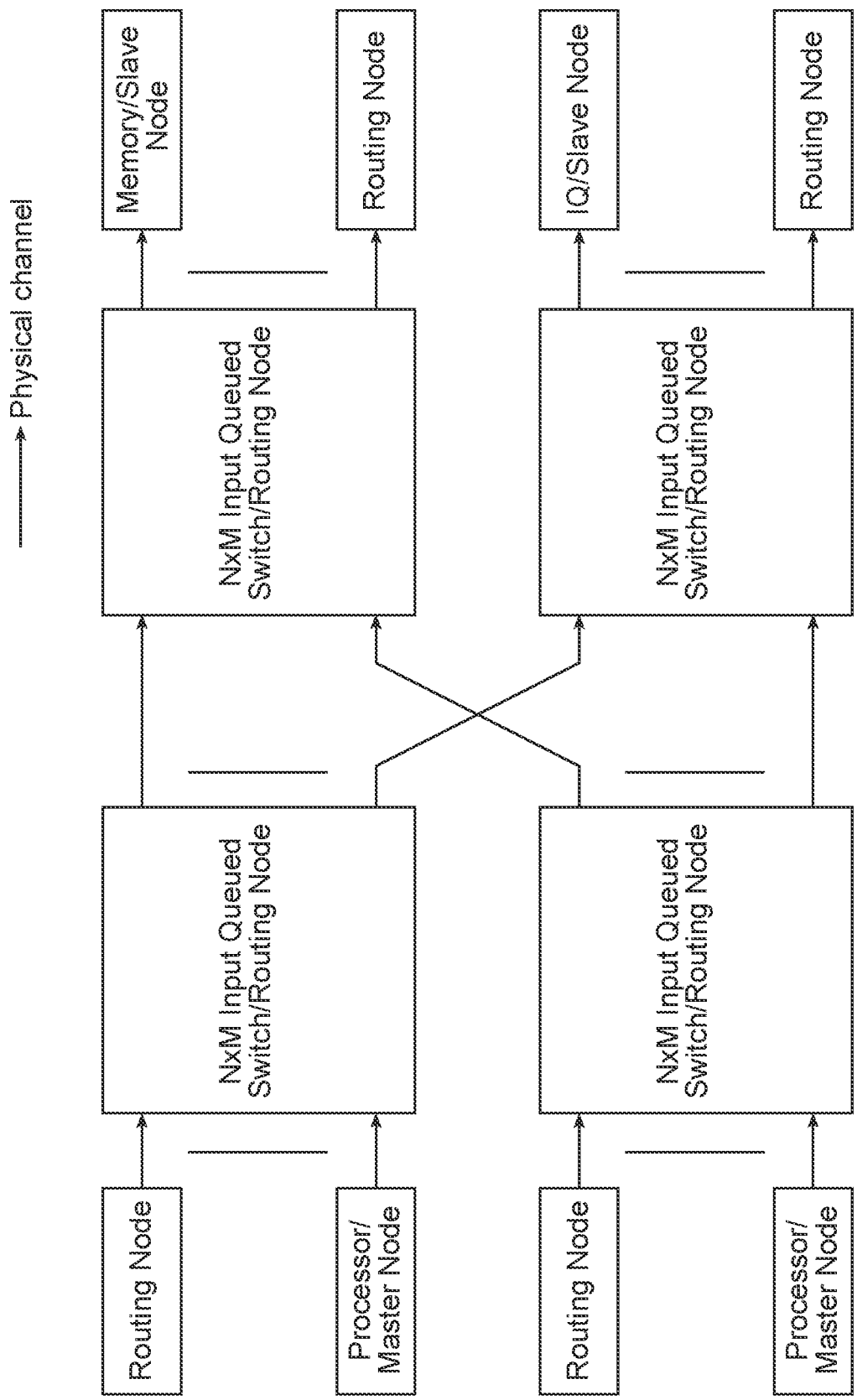
FIG. 2 is a simplified block diagram illustration of an IQ switch as a node interconnected with other nodes in a network via physical channels which connect the nodes, all provided in accordance with the present disclosure. Each node (e.g., computer/memory/network switches (switching system)), typically generates and/or consumes and/or reroutes packets and/or cells and/or other information.

It is appreciated that the IQ switch of FIG. 1 is typically itself a node (e.g. as shown in FIG. 2).

In IQ architecture, buffers are deployed at the input of the switches. When a single queue is used at the input, IQ switches suffer from a problem, termed Head of Line (HOL) blocking, in which a request to a free destination is blocked by request to a destination that is busy. HOL blocking is eliminated by using Virtual Output Queuing, where requests to each destination are stored in a separate queue. To improve network throughput and avoid deadlock, virtual channels may be introduced. A virtual channel transports an independent packet or cell between nodes by (optionally increasing and then) dividing the resource (buffer storage) associated with each physical channel into several groups, where dividing may be done by the designer of the switch. Each virtual channel has its own set of VOQs for each output at each input. Virtual channels may compete against one another to get access to physical channels.

Typically, a switching system is responsible for distributing resources. When distributing, typically, virtual channel resources must not be oversubscribed and/or conflict over a physical channel must be avoided.

Figure 3:
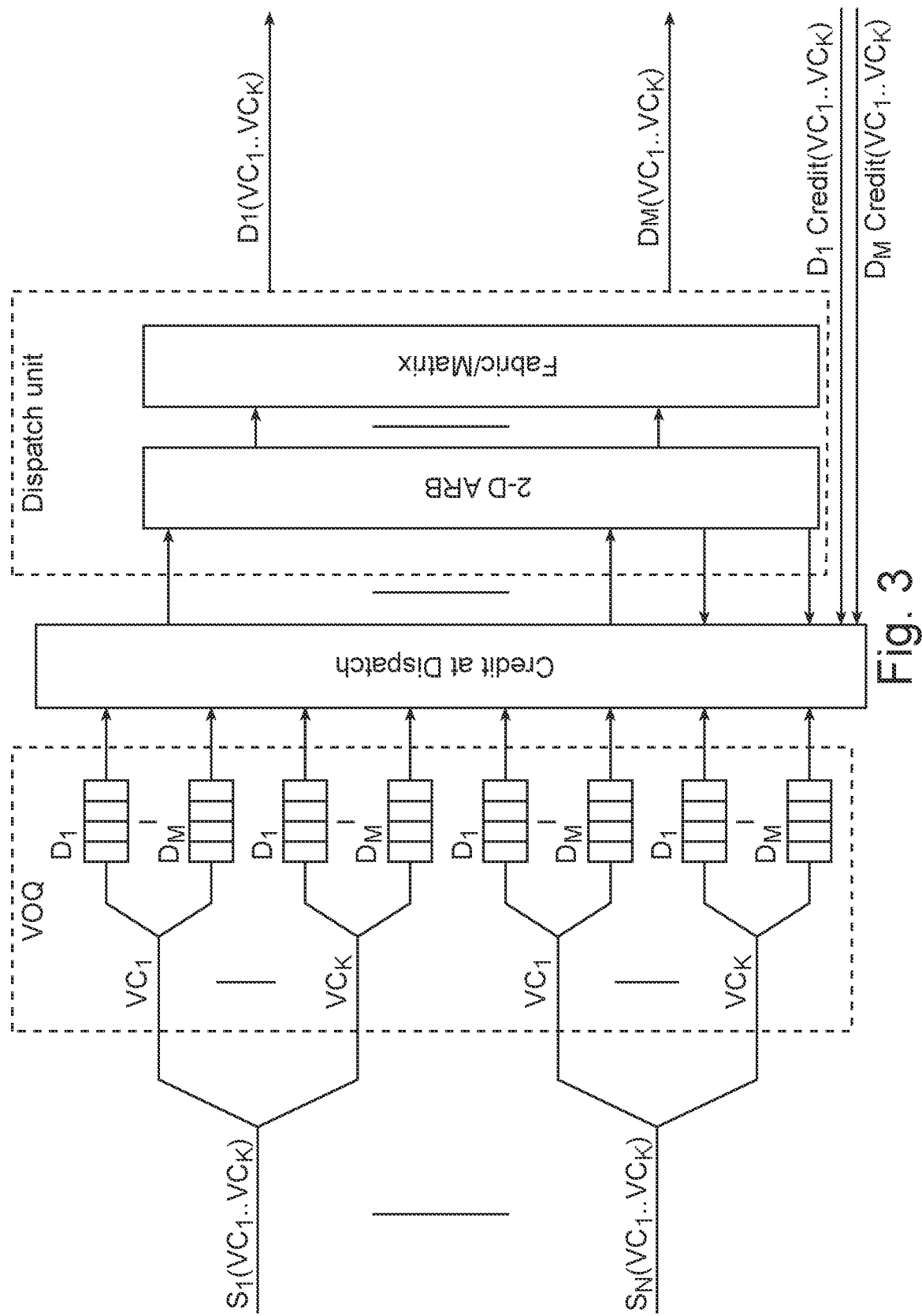
FIG. 3 is a simplified block diagram illustration of an IQ switch with multiple virtual channels and credit-based flow control ("credit at dispatch") provided in accordance with the present disclosure, which may be used standalone or in any context shown or described herein.

Each input port can receive up to one packet at a time which contains a tag with destination details and virtual channel details. Based on the virtual channel and destination details, an arriving packet is moved to a corresponding virtual channel's destination VOQ. FIG. 3 shows an N×M IQ switch with multiple (K) virtual channels, VOQs and credit-based flow control.

Credit-based flow control may be used to avoid dropping packets in switches. In credit-based flow control, packets are transmitted only when buffer space is known to exist at the destination. To support credit-based flow control, a switch typically maintains credit counters for every destination ($D_1$-$D_M$) per virtual channel. The credit counter keeps track of the buffer space at each destination D. For example, the credit counter associated with a destination D is decremented for every packet sent to that destination D, and conversely, the credit counter associated with a destination D is incremented for every credit returned from that destination D. Credits are returned from a destination D whenever a destination buffer frees up. For a multi-virtual channel switch, (as shown in FIG. 1), each virtual channel has its own credit counter and independent flow control.

Figure 4:
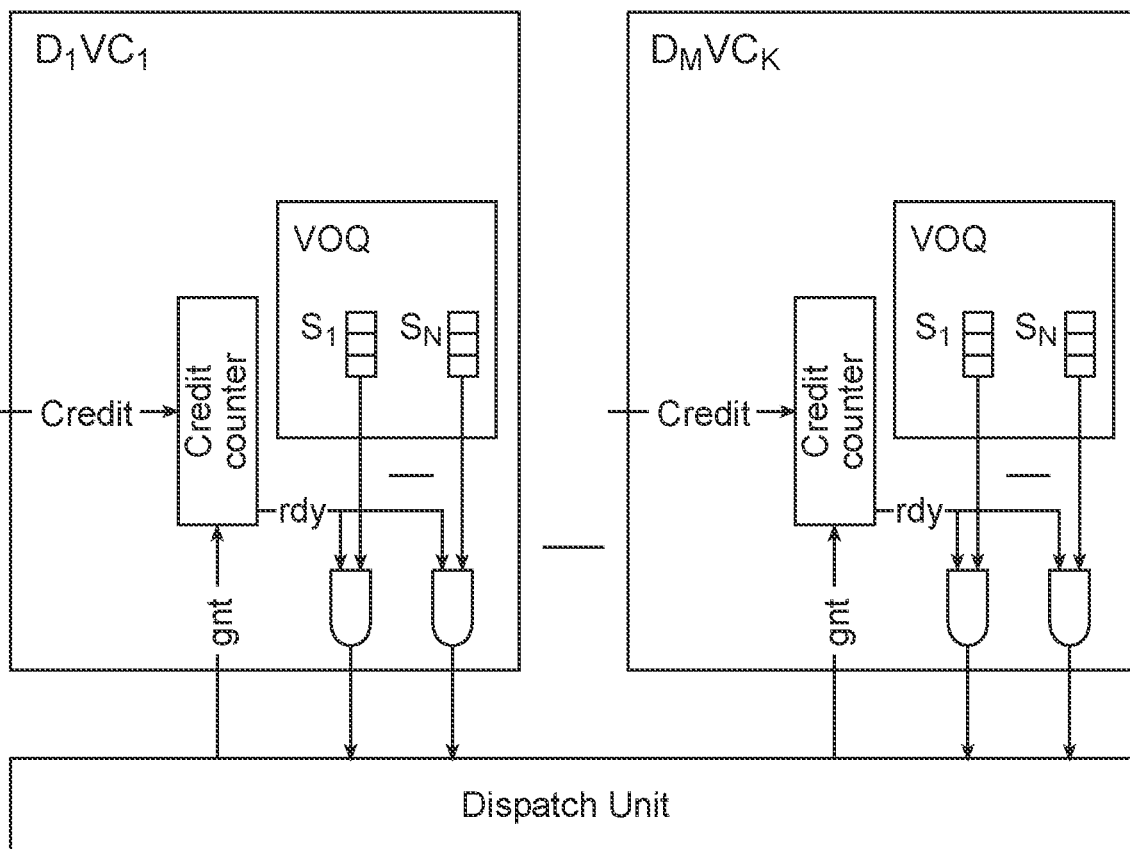
FIG. 4 is a simplified block diagram illustration of a Credit at Dispatch scheme for credit-based flow control, as provided in accordance with the present disclosure, which may be used standalone or in any context shown or described herein (e.g. to implement the "credit at dispatch" scheme of the switch in FIG. 3).

VOQs typically store incoming requests. A credit counter typically generates a "ready" when the destination has enough credit to accommodate a request. When the "ready" indication is asserted, requests in all sources' VOQs are typically exposed to the dispatch unit, else all requests are, typically, masked. Credit counters are per destination per virtual channel and are responsible for the masking/unmasking of requests in a corresponding virtual channel's 'corresponding destination VOQ. This scheme is referred to as a "credit at dispatch" scheme. FIG. 4 shows the "credit at dispatch" scheme for credit-based flow control.

In IQ switches, each input port can transmit at most one cell at a time. Each output port can receive at most one cell at a time and each output port can receive cells over only one virtual channel at a time. A dispatch unit may ensure that the above constraints are met. In an N input port, M output port, and K virtual channel switch, a dispatch unit may find a set of up to min (N,M) cells to transmit over the switch.

Figure 5:
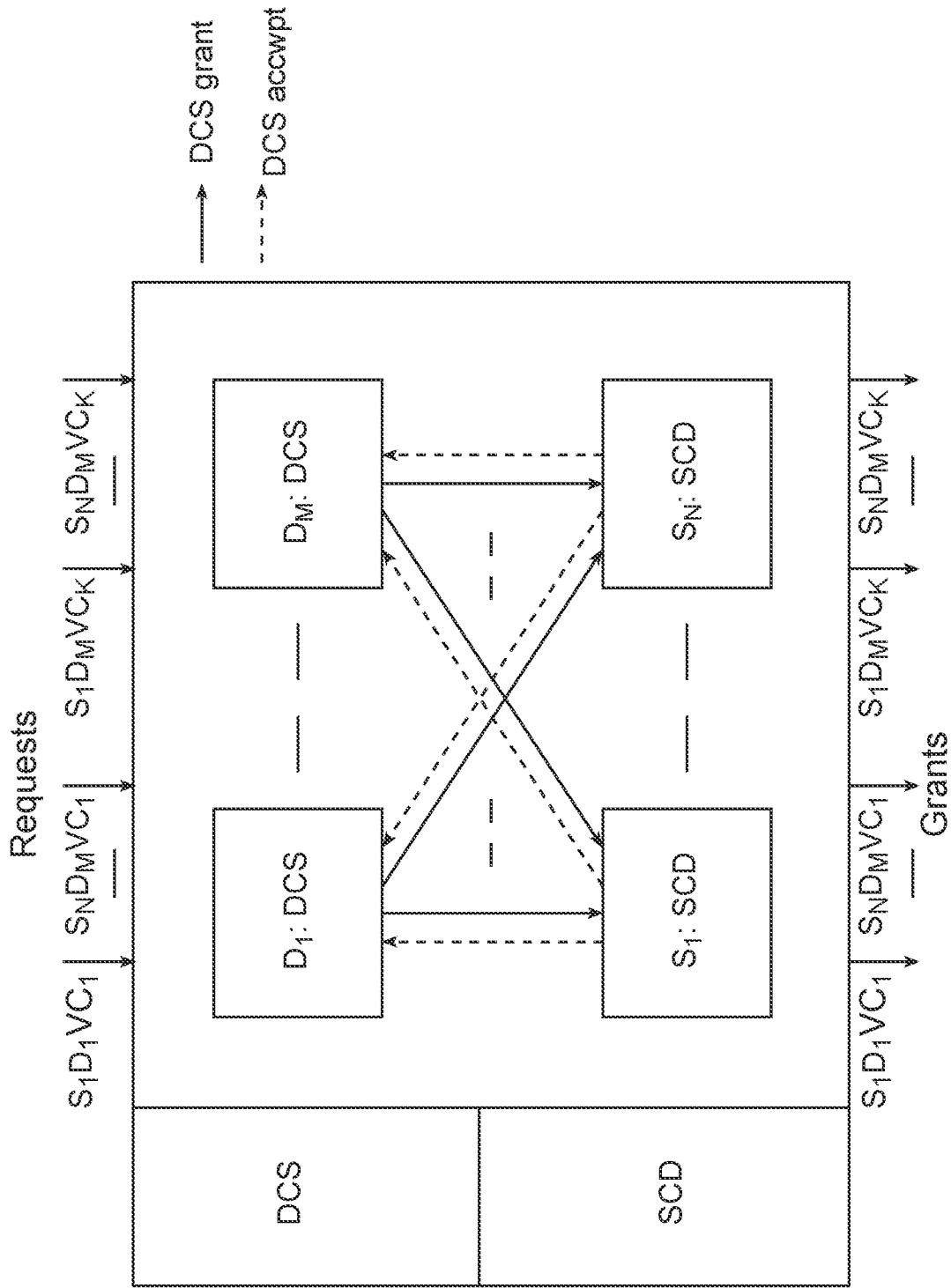
FIG. 5 is a simplified block diagram illustration of a Dispatch Unit (e.g., a 2D ARB) for a N×M switch with K virtual channels, provided in accordance with the present disclosure, which may be used standalone or in any context shown or described herein.

FIG. 5 is a simplified block diagram illustration of a Dispatch Unit ("2D ARB") for an N×M switch with K virtual channels according to an embodiment of the invention. The Dispatch unit is referred to as a 2D ARB since the dispatch unit includes two sets of arbiters. The first set of arbiters, termed a "destination choose source," or "DCS," or "DCS set," selects one source and one virtual channel per destination. The first set of arbiters is typically followed by a second set of arbiters, termed a "source choose destination," "SCD," or "SCD set" which selects a destination, from among the plurality of destinations which have selected a given source.

The DCS, or first set of arbiters in the 2D ARB, typically provides each destination with a DCS arbiter " " to select among the sources requesting that destination. A DCS arbiter " " also typically includes virtual channel select logic to arbitrate among the virtual channels to that destination. Typically, the DCS arbiter of every destination are, functionally, exactly the same. For simplicity of explanation a single destination's DCS is now described, an example of which is illustrated in FIG. 6.

Figure 6:
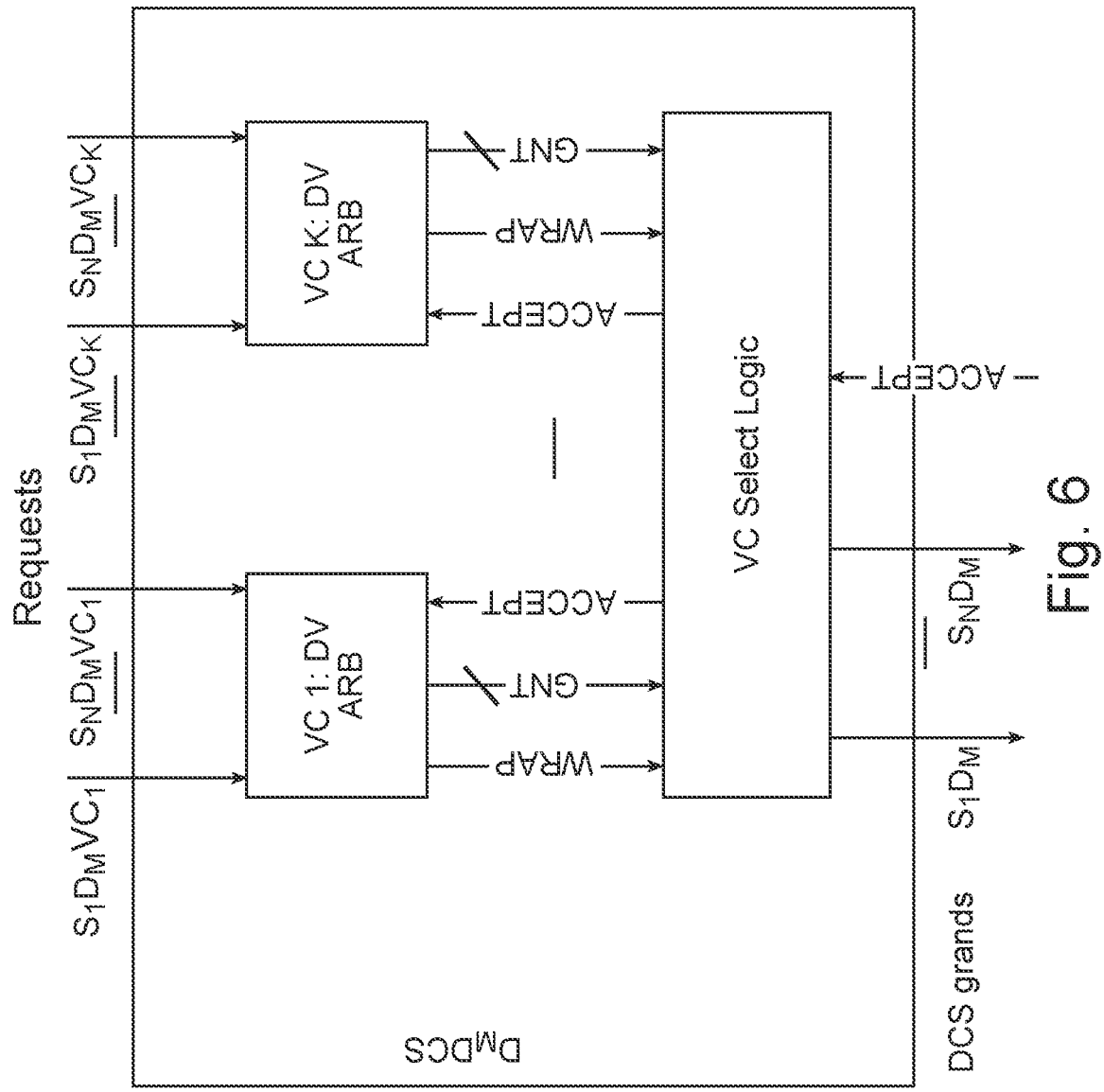
FIG. 6 is a simplified block diagram illustration of a Destination Choose Source (DCS) arbiter, provided in accordance with the present disclosure, which may be used standalone or in any context shown or described herein.

FIG. 6 is a simplified block diagram illustration of a DCS arbiter of a destination $D_M$. The DCS arbiter of FIG. 6 typically includes an arbiter for each virtual channel (e.g., one arbiter per virtual channel). Each of these arbiters may be referred to as a "destination VC" arbiter or as a DV arbiter. The DCS arbiter of FIG. 6 also typically includes virtual channel select logic to select among the DV arbiters. Typically, source requests to the same destination and the same virtual channel are connected to the same DV arbiter of the same DCS arbiter, whereas source requests to the same destination, but to different virtual channels, are connected to different DV arbiters of the same DCS arbiter, as shown in FIG. 6. Each DV arbiter typically uses a suitable arbitration scheme (e.g., a round-robin arbitration scheme) to select among the sources. The round robin arbitration scheme typically uses a pointer which points to the highest priority request and is incremented (modulo N) to one location beyond the granted request. The DV arbiter typically selects the requesting input port at or after the pointer in the round-robin arbitration scheme. All DV arbiters typically run in parallel and typically grant one of the sources. Typically, a DV arbiter updates its pointer only after receiving a Source Choose Destination (SCD) accept through the virtual channel select logic.

The virtual channel select logic typically selects a DV arbiter from among all the DV arbiters which have a granted source. The selected DV arbiter grant (e.g., DCS grant) is passed to the SCD (e.g. of FIG. 5). The virtual channel select logic uses a suitable arbitration scheme (e.g., a round robin arbitration scheme or least recently used scheme), to select among the DV arbiters. The DV arbiter so selected generates a WRAP signal when all active sources in that DV arbiter are granted. Typically, the virtual channel select logic is allowed to move to a new DV arbiter only after receiving a WRAP signal from currently selected DV arbiter. If the SCD (e.g. of FIG. 5) accepts the grant from the selected DCS, then the virtual channel select logic passes the accept to the selected DV arbiter.

A DCS with a DV arbiter in a round robin arbitration scheme and virtual channel select logic either in a RR arbitration scheme or a LRU scheme, is referred as a "Rolling-RR arbiter" (e.g. the "Rolling RR DCS" of FIG. 6).

Referring again to FIG. 5, the Source Choose Destination (SCD), or "SCD set" is the second set of arbiters in the 2D ARB of FIG. 5. According to certain embodiments, every source ($S_1$-$S_N$) has an SCD arbiter which selects among destination DCSs which have selected this source. Typically then, an SCD set includes a plurality of source SCDs, one for each source. An SCD (typically each of the source SCDs) uses a suitable scheme (e.g., a LRU scheme or RR scheme), to accept DCS grants. In an LRU scheme, at least one request (typically any request) which got a grant least recently, has highest priority relative to requests which got grants more recently, and is thus the first request in line to get the grant. Functionally the SCD arbiter of every source is exactly the same.

Figure 7:
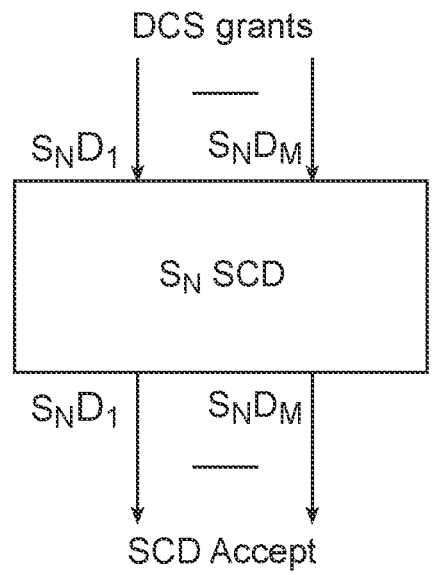
FIG. 7 is a simplified block diagram illustration of a Source Choose Destination (SCD) arbiter, provided in accordance with the present disclosure, which may be used standalone or in any context shown or described herein.

FIG. 7 is a simplified block diagram illustration of a Source Choose Destination arbiter for a source $S_N$.

Typically, the dispatch unit of FIG. 5 makes a connection between input and output nodes by performing all or any subset of the following operations 1-4, in any suitable order:

Operation 1: Each input port sends a request to at least one (typically each) output port, to every virtual channel for which the input port has at least one queued cell.

Operation 2: For each destination, each DV arbiter selects one source, from among the sources which have a request to this destination and virtual channel. Typically, this results in one selected source per virtual channel per destination.

Operation 3: Each destination's virtual channel select logic selects one of the DV arbiters' grants, from among the DV arbiters of this destination which have grants. Typically, this results in one selected virtual channel per destination.

Operation 4: Each source then arbitrates among those destination DCSs which have selected this source. Typically, this results in one selected destination per source.

Figure 8:
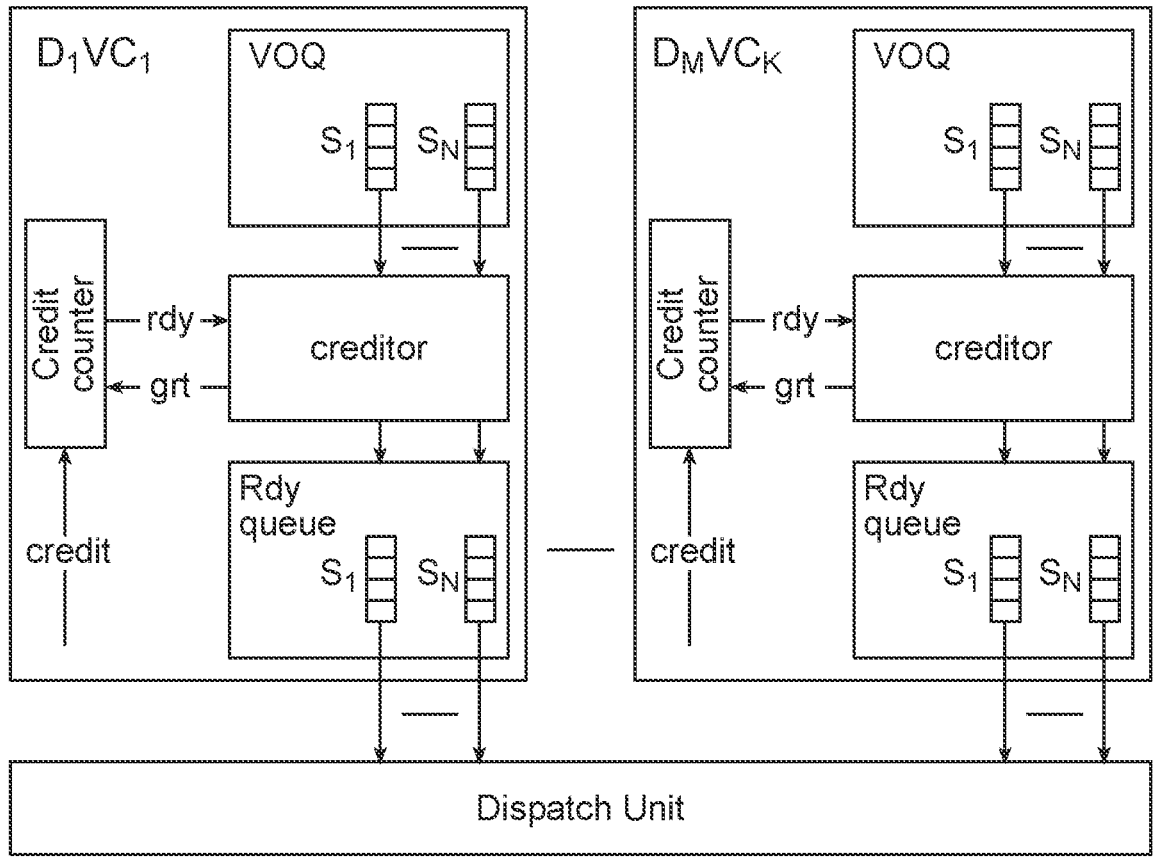
FIG. 8 is a simplified block diagram illustration of a pre-creditor scheme for credit-based flow control provided in accordance with the present disclosure.

It is appreciated that IQ switches may use any suitable crediting scheme to support credit-based flow control, such as but not limited to the following:

"Pre-creditor" scheme: incoming requests are pre-credited by deducting the destination credit and the dispatcher unit dispatches the pre-credited requests (as shown in FIG. 8).

"Credit at dispatch" scheme: credits are deducted only for dispatched requests. Requests are placed to the dispatch unit when the destination has enough credit to support at least one request (as shown in FIG. 4).

The existing dispatch unit (e.g., FIG. 5 which is for a 2×3 switch with two virtual channels may use any suitable arbitration scheme to make connections between input and output ports, such as but not limited to the following:

RR-LRU arbitration scheme: DCS arbiter uses RR arbitration scheme and SCD arbiter uses LRU scheme.

LRU-LRU arbitration scheme: both the DCS arbiter and SCD arbiter use a LRU arbitration scheme.

It is appreciated that existing switches may use the following combinations of a crediting scheme and a dispatch unit arbitration scheme:

"Pre-creditor" with RR-LRU algorithm—which may have an area/power penalty; or

"Credit at dispatch" with LRU-LRU algorithm—which may have a performance penalty.

Conventionally, a "Credit at dispatch" scheme, with an RR-LRU arbitration scheme, has performance, power and area benefit but may have a virtual channel starvation issue (i.e., there may be virtual channel requests that remain unserved indefinitely). The dispatch unit described herein, (e.g., the Rolling RR DCS-SCD illustrated in FIG. 5) solves the virtual channel starvation issue and also improves performance and area/power.

Figure 10:
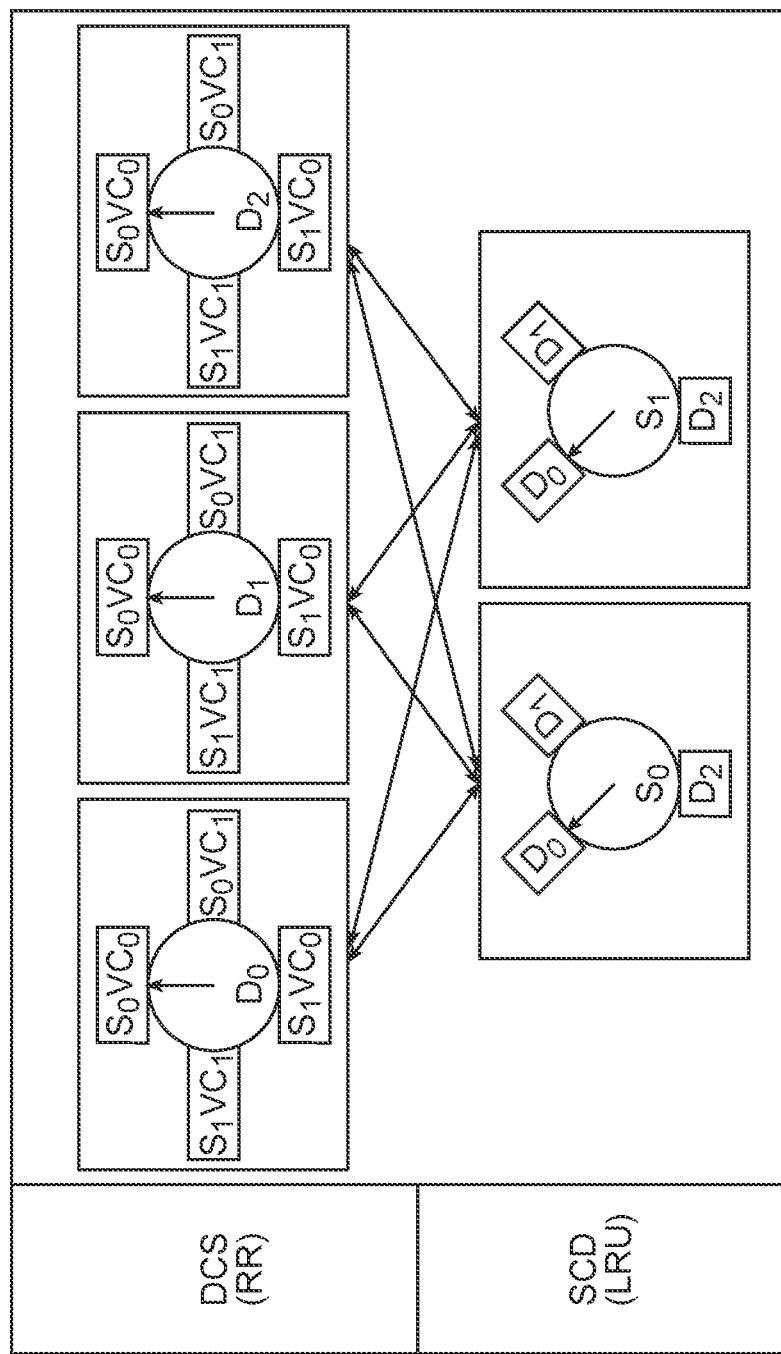
FIG. 10 is a simplified block diagram illustration of an existing 2D ARB for 2×3 switch with 2 virtual channels, all provided in accordance with the present disclosure.

An example of starvation may be appreciated by considering by way of example the 2×3 switch with two virtual channels shown in FIG. 9. An existing RR-LRU dispatch unit for the 2×3 switch in FIG. 9, as shown in FIG. 10, has a DCS set, with a RR arbiter per destination which selects a source and a virtual channel per destination, and a SCD set, with an LRU arbiter per source. An example of starvation is shown in FIG. 11, in which the DCS ARB $D_0$ arbiter has 4four requests, $S_0VC_0$, $S_0VC_1S_1VC_0$, and $S_1VC_1$.

Figure 11:
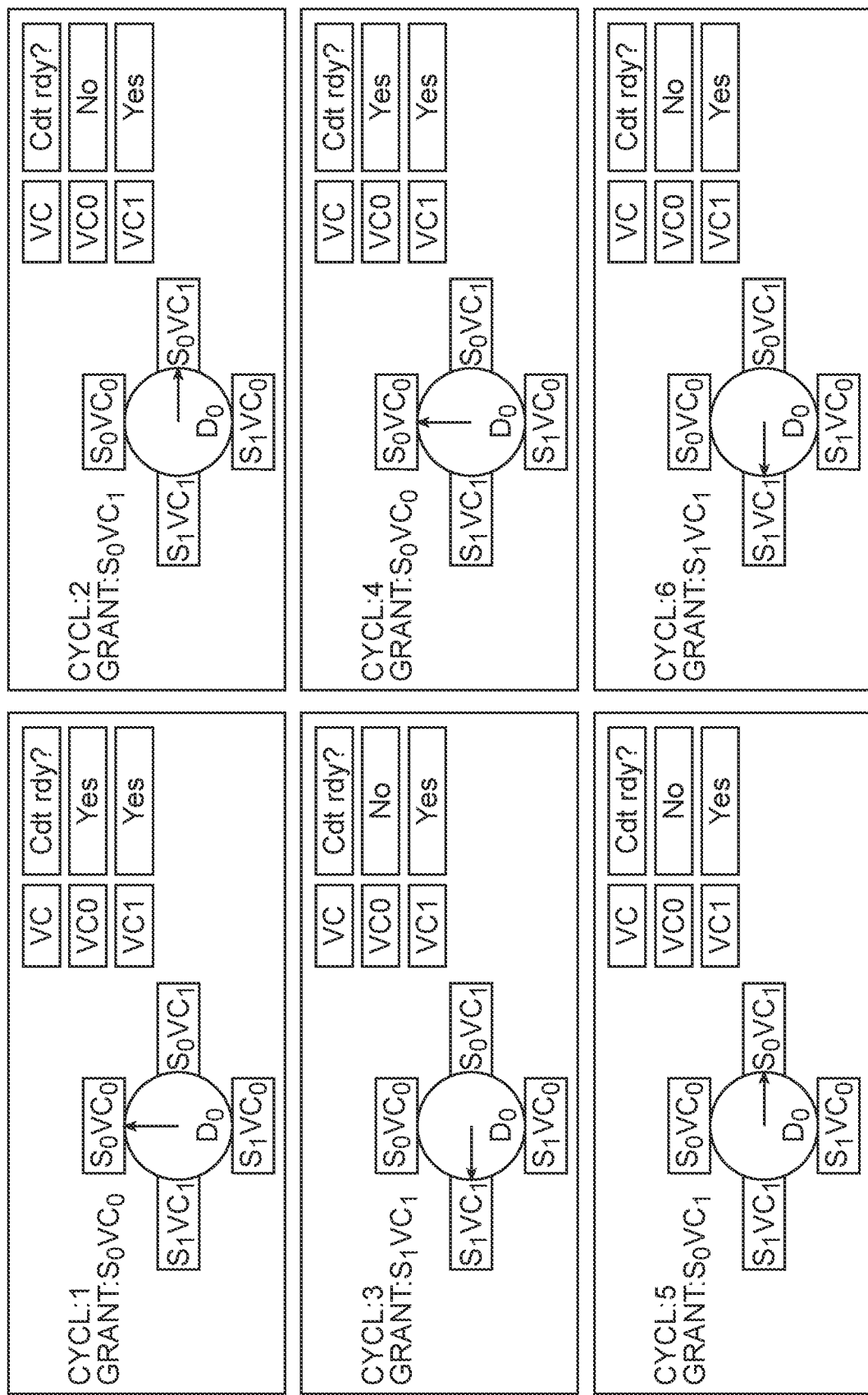
FIG. 11 is a simplified block diagram illustration of a Starvation for RR DCS for $D_0$ destination with a "credit at dispatch" scheme, all provided in accordance with the present disclosure.

The example of starvation shown in FIG. 11 involves two sources $S_0$, $S_1$, and two virtual channels—$VC_0$, $VC_1$—going to a destination $D_0$.

$S_0VC_0$ and $S_1VC_0$, belong to the same virtual channel, say $VC_0$.

$S_0VC_1$ and $S_1VC_1$, belong to the same virtual channel, say $VC_1$.

A RR pointer moves in the $S_0VC_0 \rightarrow S_0VC_1 \rightarrow S_1VC_0 \rightarrow S_1VC_1 \rightarrow S_0VC_0$ ... direction. If $VC_0$ credit is available only after three clock cycles have elapsed from the time the $VC_0$ credit is consumed, and if $VC_1$ credit is always available, then $D_0$ ARB may grant the request in the following order; the clock cycles 1-6 below may be seen in the top left, top right, middle left, middle right, bottom left and bottom right portions, respectively, of FIG. 11:

Clock cycle 1: Both $VC_0$ and $VC_1$ credits are available, and all four requests are exposed to ARB. ARB pointer is at $S_0VC_0$ and the ARB grants request $S_0VC_0$. ARB pointer is updated to favor the request that is just after the one granted, (i.e., $S_0VC_1$). Grant of (or responsive to) request $S_0VC_0$ consumes $VC_0$ credit.

Clock cycle 2: $VC_0$ credit is not available and all $VC_0$ requests are masked. ARB grants request $S_0VC_1$. ARB pointer is updated to point to next request (i.e., $S_1VC_0$). Grant of request $S_-_0VC_1$ consumes $VC_1$ credits.

Clock cycle 3: ARB sees request from only $S_0VC_1$ and $S_1VC_1$. ARB pointer will skip $S_1VC_0$ since the request is masked by credit unavailability and, instead, ARB grants request $S_1VC_1$. ARB pointer is updated to point to next request (i.e., request $S_0VC_0$).

Clock cycle 4: $VC_0$ credit is returned, and ARB sees all four requests. Since the ARB pointer is at request $S_0VC_0$ the ARB grants request $S_0VC_0$. The ARB pointer is updated to point to the next request which is $S_0VC_1$. Grant of request $S_0VC_0$ consumes $VC_0$ credits.

Clock cycle 5: $VC_0$ credit not available due to grant to $S_0VC_0$ in previous clock cycle, as occurred in clock cycle 2. The ARB grants request $S_0VC_1$ and the ARB pointer is updated to favor the next request.

Clock cycle 6: $VC_0$ credit is not available, and ARB sees requests from only $S_0VC_1$ and $S_1VC_1$ as occurred in clock cycle 3. The ARB pointer will skip $S_1VC_0$ since the request is masked by credit unavailability, and, instead, the ARB grants request $S_1VC_1$.

Unfortunately, the above scenario can repeat ad infinitum—causing request $S_1VC_0$ to be "starved" (i.e., remain unserved indefinitely).

However, according to certain embodiments, a "credit at dispatch" scheme is used by masking a request when credit is not available to ensure no request is granted other than when credit is available. The masking feature of the "credit at dispatch" scheme, and the skipping that occurs in the RR algorithm, yields virtual channel starvation. However, certain embodiments herein solve the virtual channel starvation problem by decoupling the masking feature of the credit at dispatch scheme from the skipping that occurs in RR algorithms (i.e., the embodiment may freeze a RR pointer corresponding to virtual channel request/s that is/are (e.g., currently) masked by the "credit at dispatch" scheme. This may be achieved by splitting a single RR arbiter into a plurality of virtual channel specific RR arbiters, or by replacing a single RR arbiter with a plurality of RR arbiters, each of which is virtual channel specific, in combination with virtual channel select logic to select one of the DV arbiter grant vectors, to avoid two grants to the same destination (Rolling RR DCS).

Figure 12:
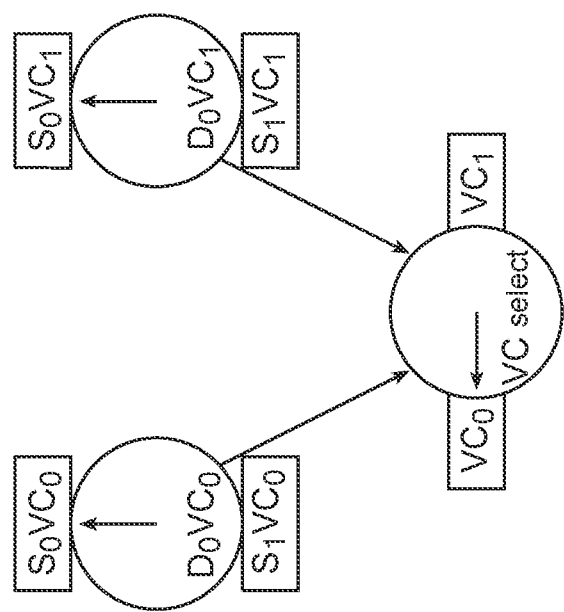
FIG. 12 is a simplified block diagram illustration of a Rolling RR DCS for $D_0$ destination, all provided in accordance with the present disclosure.

FIG. 12 shows a Rolling RR DCS for destination $D_0$. When credit of any virtual channel runs out, the "credit at dispatch" scheme may mask all requests to that virtual channel's "exclusive" RR arbiter and the RR pointer may be stuck (frozen) until credit is returned to that virtual channel. Due to this credit-at-dispatch request masking, no requests are skipped (e.g. no VC requests remain unserved indefinitely).

Figure 13:
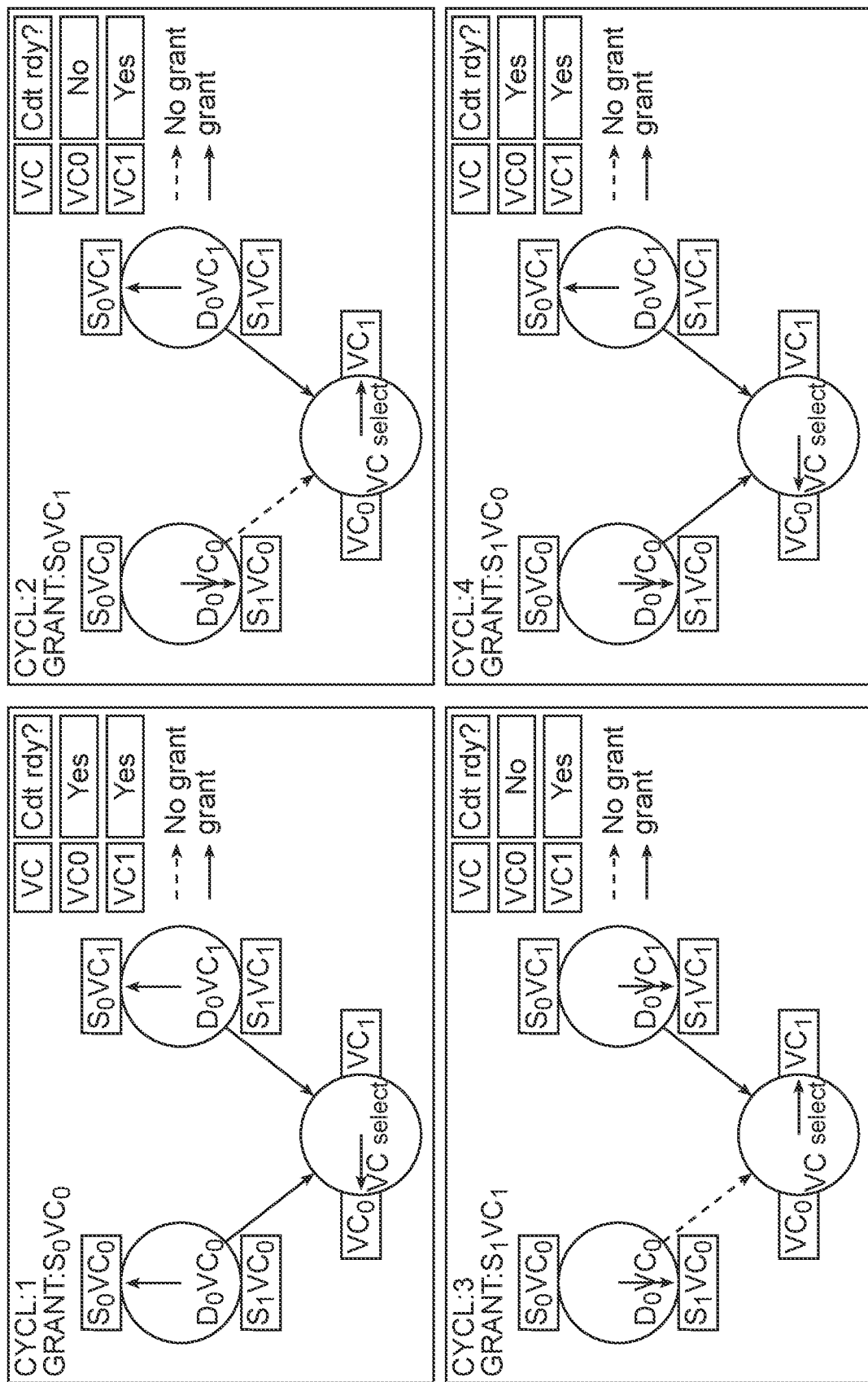
FIG. 13 is a simplified block diagram illustration of a Starvation free Rolling RR DCS for $D_0$ destination with a "credit at dispatch" scheme, all provided in accordance with the present disclosure.

Still referring to the above presented virtual channel victimization scenario with the RR arbiter replaced by a Rolling-RR DCS arbiter, assume for simplicity that the virtual channel select logic is simple LRU. The clock cycles 1-4 below may be seen in the top left, top right, bottom left and bottom right quadrants, respectively, of FIG. 13:

Clock cycle 1: Both $VC_0$ and $VC_1$ credits are available, $D_0VC_0$ ARB sees request from $S_0VC_0$ and $S_1VC_0$, $D_0VC_1$ arbiter sees requests from $S_0VC_1$ and $S_1VC_1$. $D_0VC_0$ ARB grants request $S_0VC_0$ and $D_0VC_1$ ARB grants request $S_0VC_1$. virtual channel select logic selects or accepts grants from $D_0VC_0$ ARB. Virtual channel select logic pointer is updated to point to $D_0VC_1$ ARB. DV ARB pointer is updated if, and only if the grant is accepted by virtual channel select logic. In this case only $VC_0$ ARB pointer is updated to point to next request (i.e., request $S_1VC_0$) and $D_0VC_1$ ARB pointer are unchanged. Grant to request $S_0VC_0$ consumes $VC_0$ credit.

Clock cycle 2: $VC_0$ credit is not available due to grant to $S_0VC_0$ in previous clock cycle; all $VC_0$ requests are masked. As a result, $D_0VC_0$ ARB sees no request. the pointer of $D_0VC_1$ ARB (which sees requests from $S_0VC_1$ and $S_1VC_1$) is at request $S_0VC_1$ so $D_0VC_1$ ARB grants request $S_0VC_1$. The virtual channel select logic pointer is at $D_0VC_1$ thus the $D_0VC_1$ grants are accepted. Virtual channel select logic pointer is updated to favor $D_0VC_0$ ARB. The $D_0VC_1$ ARB pointer is updated to favor request $S_1VC_1$. The grant of request $S_0VC_1$ consumes $VC_1$ credits.

Clock cycle 3: $VC_0$ credit has not yet returned, thus $D_0VC_0$ ARB sees no request. $D_0VC_1$ ARB sees requests from $S_0VC_1$ and $S_1VC_1$. $D_0VC_1$ ARB grants request $S_1VC_1$. Virtual channel select logic pointer is at $D_0VC_0$ but since there is no grant from $D_0VC_0$, the virtual channel select logic accepts grants from $D_0VC_1$. The $D_0VC_1$ ARB pointer is updated to favor request $S_0VC_1$.

Clock cycle 4: $VC_0$ credit is returned. The $D_0VC_0$ ARB sees requests $S_0VC_0$ and $S_1VC_0$. The $D_0VC_1$ ARB sees requests $S_0VC_1$ and $S_1VC_1$. The $D_0VC_0$ ARB grants request $S_1VC_0$ and $D_0VC_1$ ARB grants request $S_0VC_1$. Virtual channel select logic pointer, which is at $D_0VC_0$, accept grants from $D_0VC_0$ ARB. The virtual channel select logic pointer is updated to favor $D_0VC_1$ ARB grants. The $D_0VC_0$ ARB pointer is updated to favor request $S_0VC_0$.

Thus in the above example, all requests are granted in four cycles, and zero requests are skipped, thereby to eliminate starvation.

Figure 14:
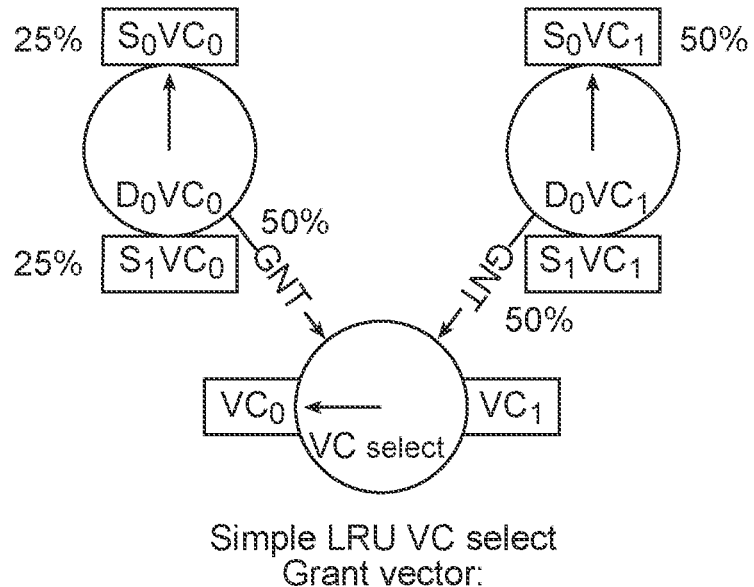
FIG. 14 is a simplified block diagram illustrating an example of bandwidth unfairness with simple LRU virtual channel select logic, all provided in accordance with the present disclosure.
Figure 15:
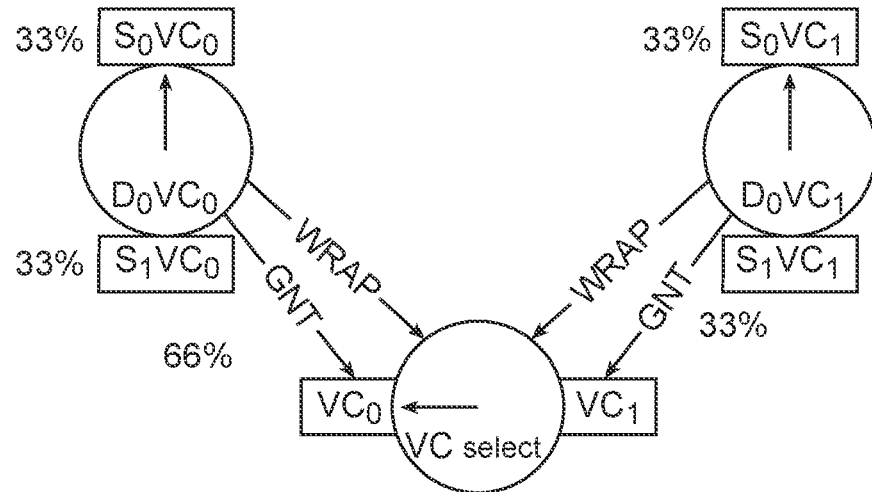
FIG. 15 is a simplified block diagram illustrating an example of bandwidth fairness with Wrap based LRU virtual channel select logic, all provided in accordance with the present disclosure.

The virtual channel select logic typically decides which DV ARB grants need to be considered. Having conventional or simple LRU logic with a grant pointer updated for every grant from DV ARB will lead to unfairness between virtual channels (as shown in FIG. 5). In this example $VC_0$ has requests from both $S_0$ and $S_1$ whereas $VC_1$ has only a request from $S_0$. With this kind of traffic pattern, $S_0$ $VC_1$ gets 50% of the bandwidth, and the remaining 50% bandwidth is split between $S_0$ $VC_0$ and $S_1$ $VC_0$. This bandwidth split is seen in the grant vector in FIG. 14. The reason for this unfairness is, typically, that the grant pointer of the virtual channel select logic is updated for every grant from DV ARB, irrespective of the number of requests presented to that DV ARB. However, this bandwidth unfairness may be remedied by updating the virtual channel select logic grant pointer only after all active requests in the selected DV ARB are serviced (as shown in FIG. 15). Virtual channel select logic may receive indication (e.g., WRAP) from a DV ARB that indicates when all active requests have been serviced. After (or responsive to) receiving the WRAP input, the virtual channel select logic pointer may be updated to favor the next DV ARB. As is apparent from the grant vector of FIG. 15, all requests, irrespective of their virtual channels, may get equal bandwidth.

Figure 16:
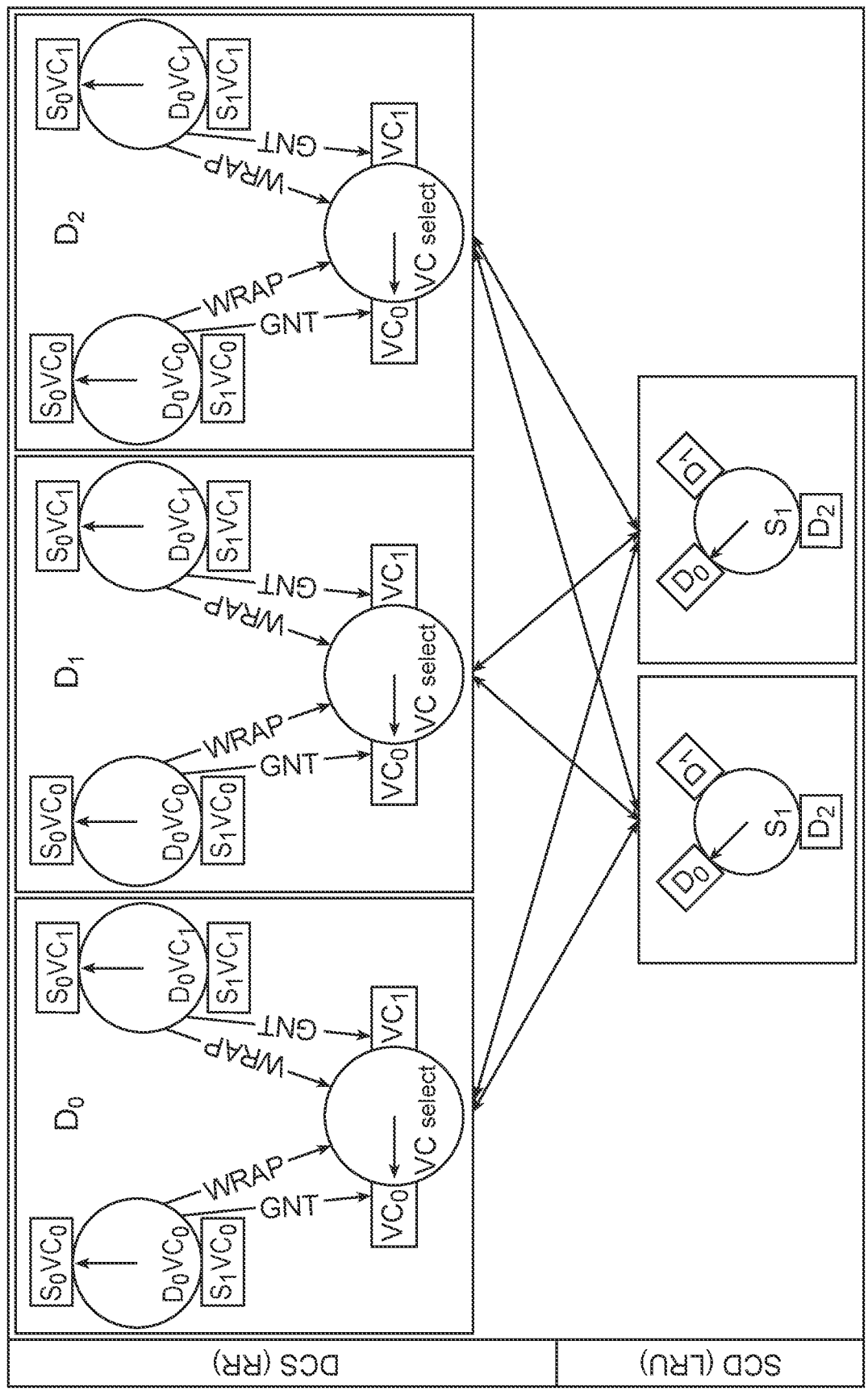
FIG. 16 is a simplified block diagram illustration of a Rolling RR-LRU 2D ARB for a 2×3 switch with two virtual channels, all provided in accordance with the present disclosure.

FIG. 16 shows a starvation free dispatch unit (Rolling RR-LRU) described herein for 2×3 switch with two virtual channels in FIG. 9.

Figure 17A:
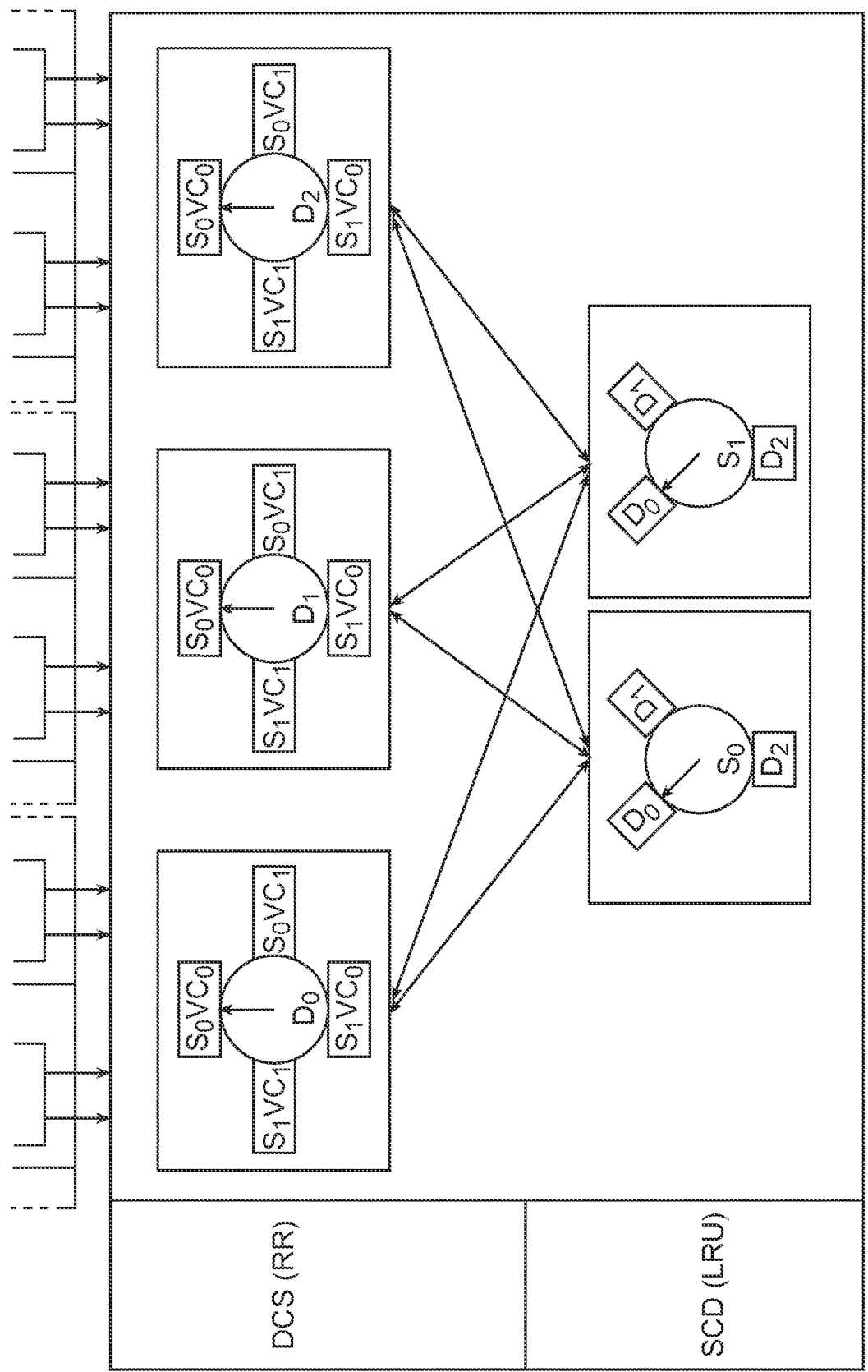
FIGS. 17A-17B, taken together, form a simplified block diagram illustration of a RR-LRU 2D ARB with a pre-creditor crediting scheme a for 2×3 switch with two virtual channels, which has an area/power penalty, all provided in accordance with the present disclosure.
Figure 17B:
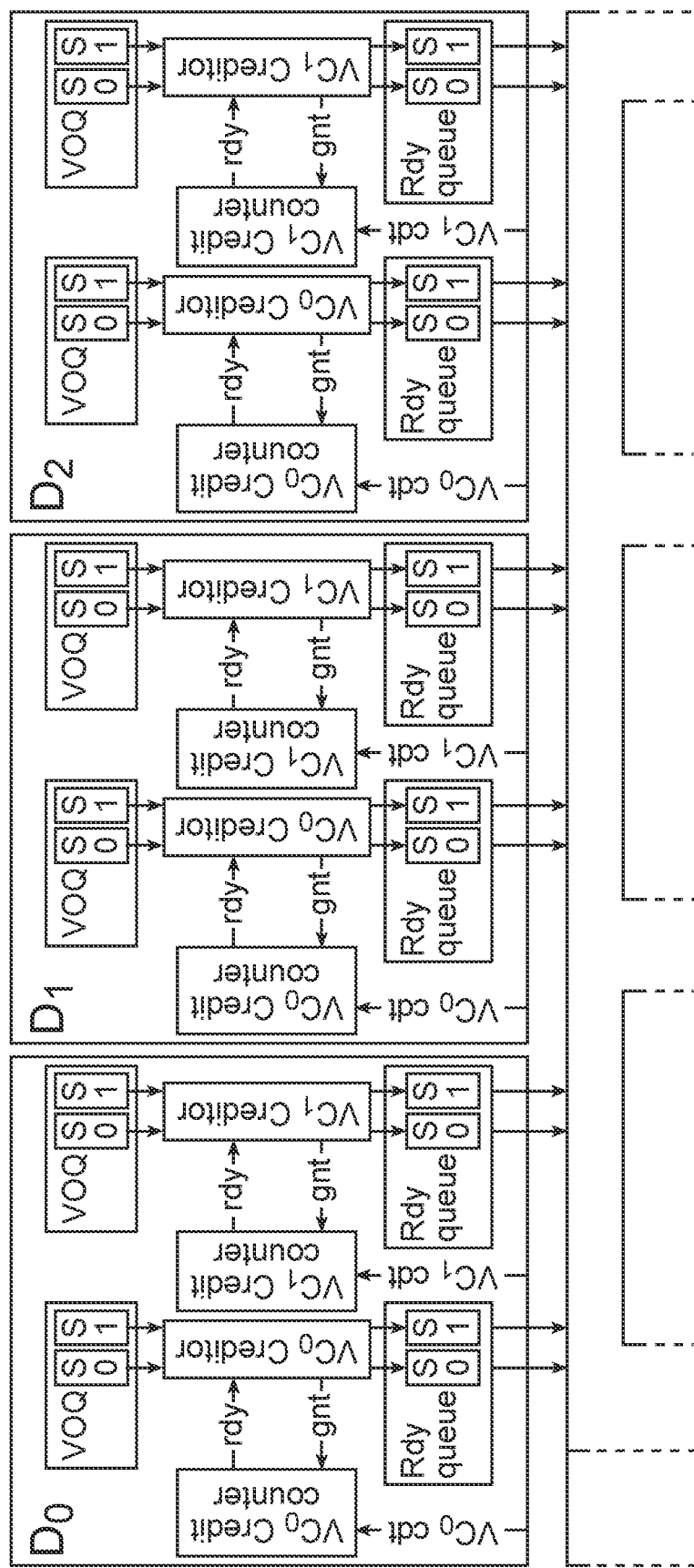

FIGS. 17A-17B, taken together, show a pre-creditor crediting scheme with an existing RR-LRU dispatch unit for a 2×3 switch with two virtual channels, shown in FIG. 9, which has area and power penalty.

Area: Pre-creditor vs Credit at dispatch: The table of FIG. 21 shows buffer depth for 6×6 switch with two virtual channels, assuming MTU (maximum transaction unit) 5, ready queue depth 1, and RTT (round trip latency excluding ready queue) 10. Extra credit indicates the credit that may be required to expose request/s from all sources to a destination per virtual channel. From the table in FIG. 21, the pre-creditor scheme requires 2.7 times more credit compared to the "credit at dispatch" scheme. This factor increases as switch size increases and in the number of virtual channels. A "credit at dispatch" scheme does not need a ready queue, thus the "credit at dispatch" crediting scheme is area efficient compared to the pre creditor scheme (as shown in the table of FIG. 21).

These equations may be used for computation of credit:

Credit at dispatch: RTT+MTU

Pre-creditor: RTT+MTU+ready queue depth+Extra credit(EC)

Where EC=(#src−1)*MTU

Figure 20:
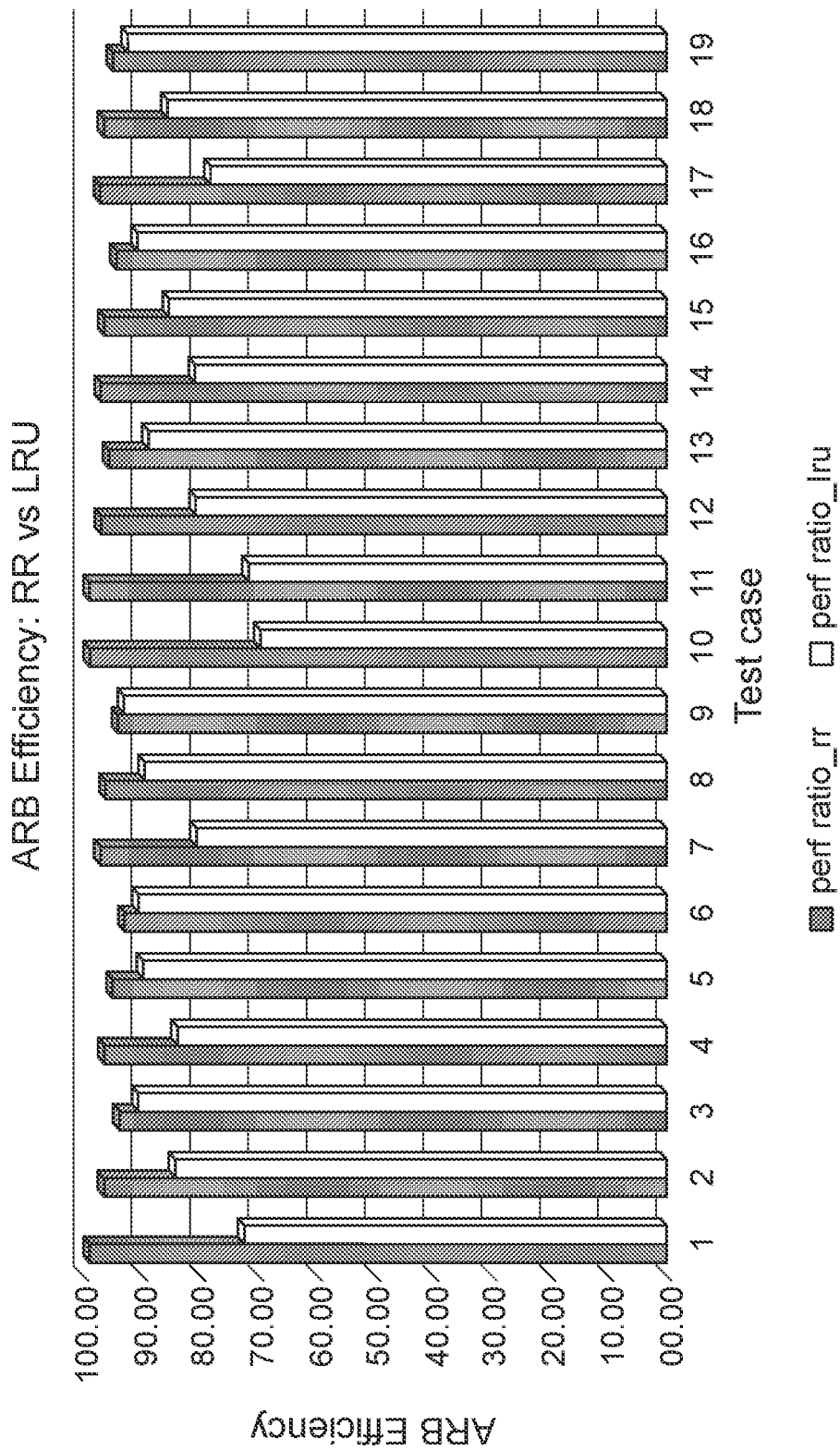
FIG. 20 is a simplified block diagram illustration of arbiter efficiency of RR+LRU vs LRU+LRU, all provided in accordance with the present disclosure.

Performance: RR-LRU vs LRU-LRU: The graph in FIG. 20 shows ARB efficiency, comparing RR-LRU vs—LRU-LRU arbitration schemes. From the graph all test cases RR-LRU have better performance compared to LRU-LRU, with a max performance gain of 30% and a min performance gain of 1%. These results are given for single beat only, for multi beat only, and for a mix of single beat and multi beat traffic, for a 6×6 switch.

From the graph (ARB efficiency RR vs LRU) in FIG. 20, it is apparent that the RR-LRU arbitration scheme has performance gain over LRU-LRU arbitration and from the table of FIG. 21, it is apparent that creditor at dispatch has area, hence power benefit, over pre-creditor. Creditor at dispatch with Rolling RR-LRU arbitration scheme has both area/power and performance benefits, and is starvation free. Thus, virtual channel starvation free Rolling RR-LRU iSLIP algorithm is a useful solution for switches generally.

Figure 18A:
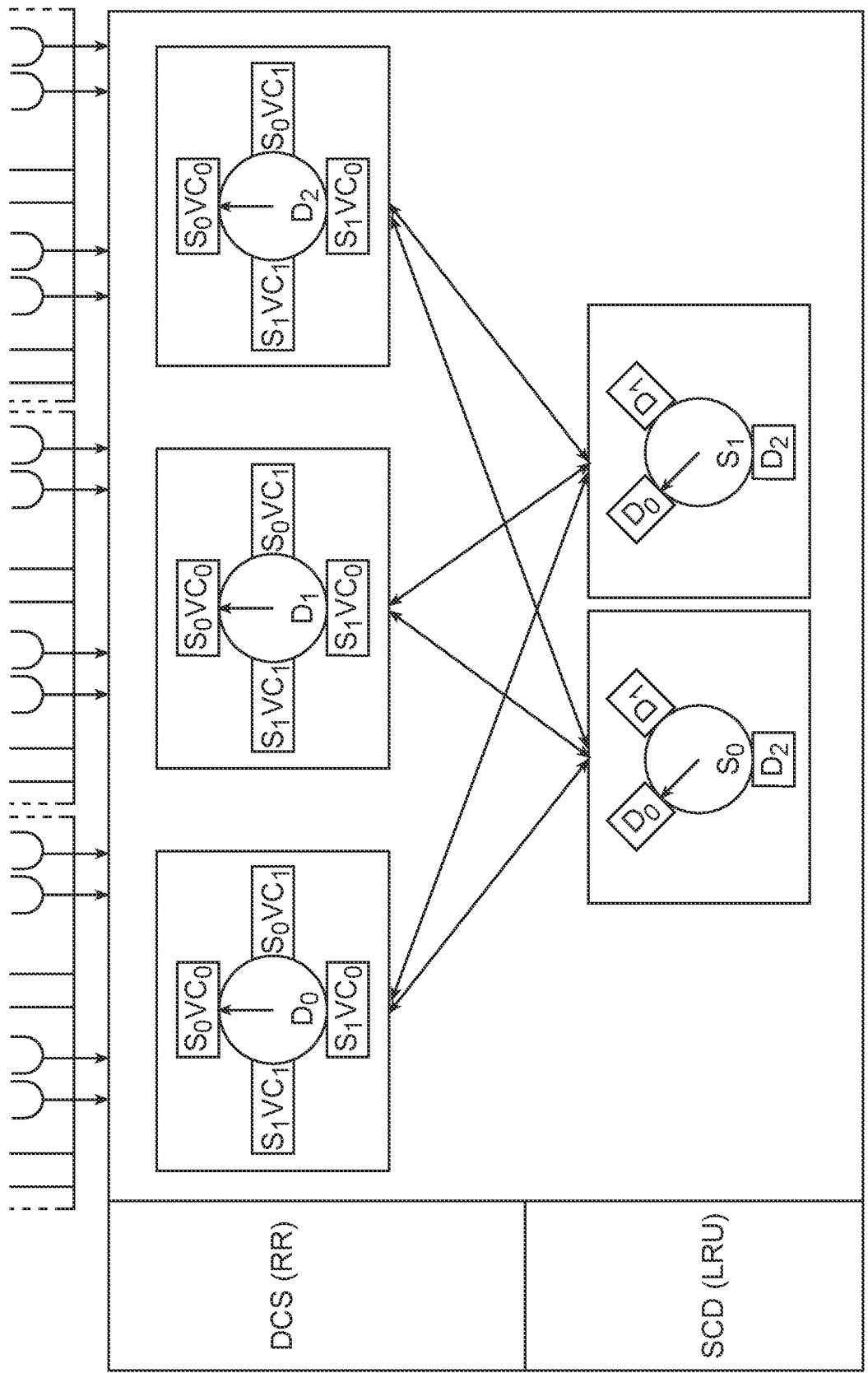
FIGS. 18A-18B, taken together, form a simplified block diagram illustration of an RR-LRU 2D arbiter provided in accordance with the present disclosure, which uses a "credit at dispatch" crediting scheme for a 2×3 switch with two virtual channels which has a virtual channel starvation issue.
Figure 18B:
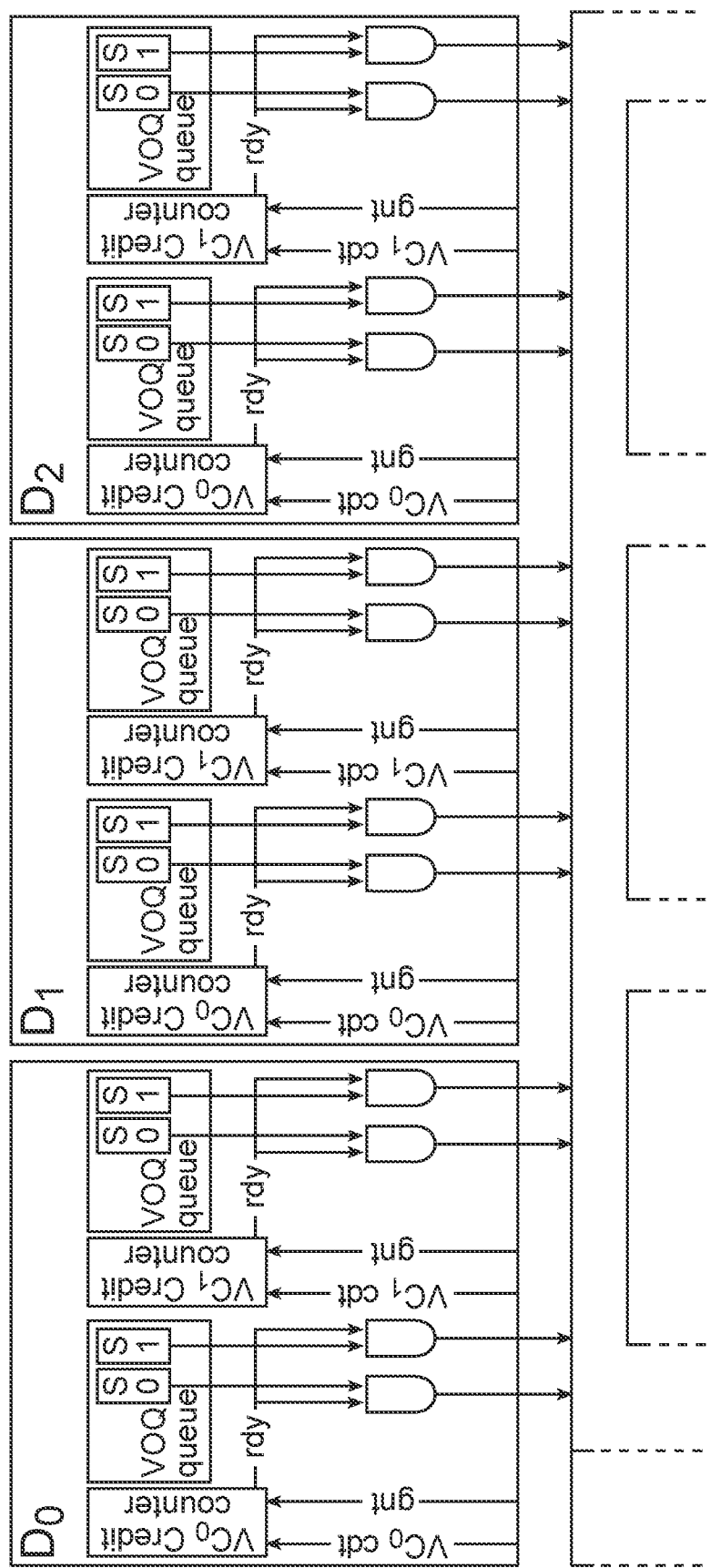

FIGS. 18A-18B, taken together, show the "credit at dispatch" crediting scheme with existing RR-LRU dispatch unit (for 2×3 switch with two virtual channels in FIG. 9) that has a virtual channel starvation issue.

Figure 19A:
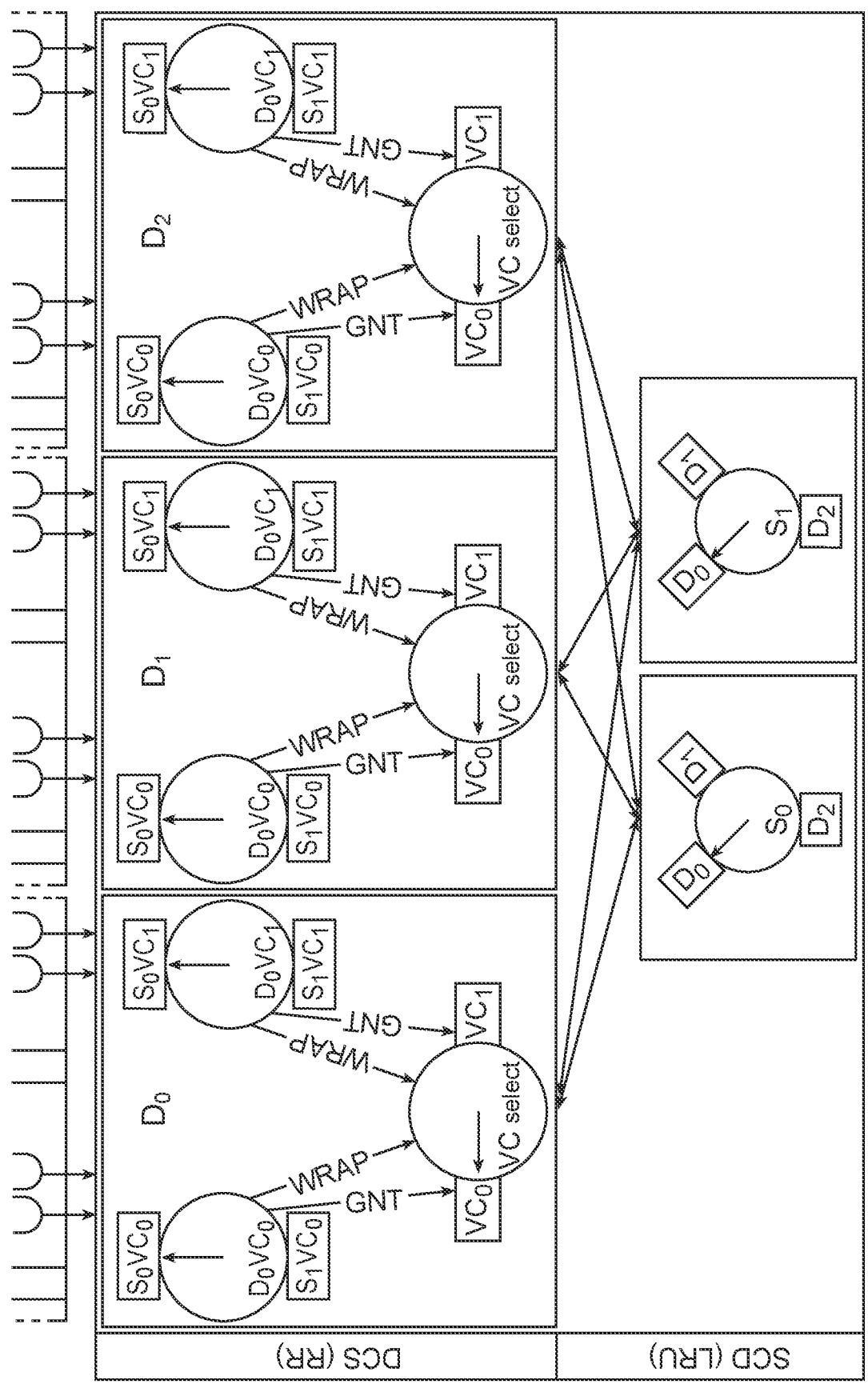
FIGS. 19A-19B, taken together, form a simplified block diagram illustration of a starvation free Rolling RR-LRU 2D ARB with a "credit at dispatch" crediting scheme for a 2×3 switch with two virtual channels, all provided in accordance with the present disclosure.
Figure 19B:
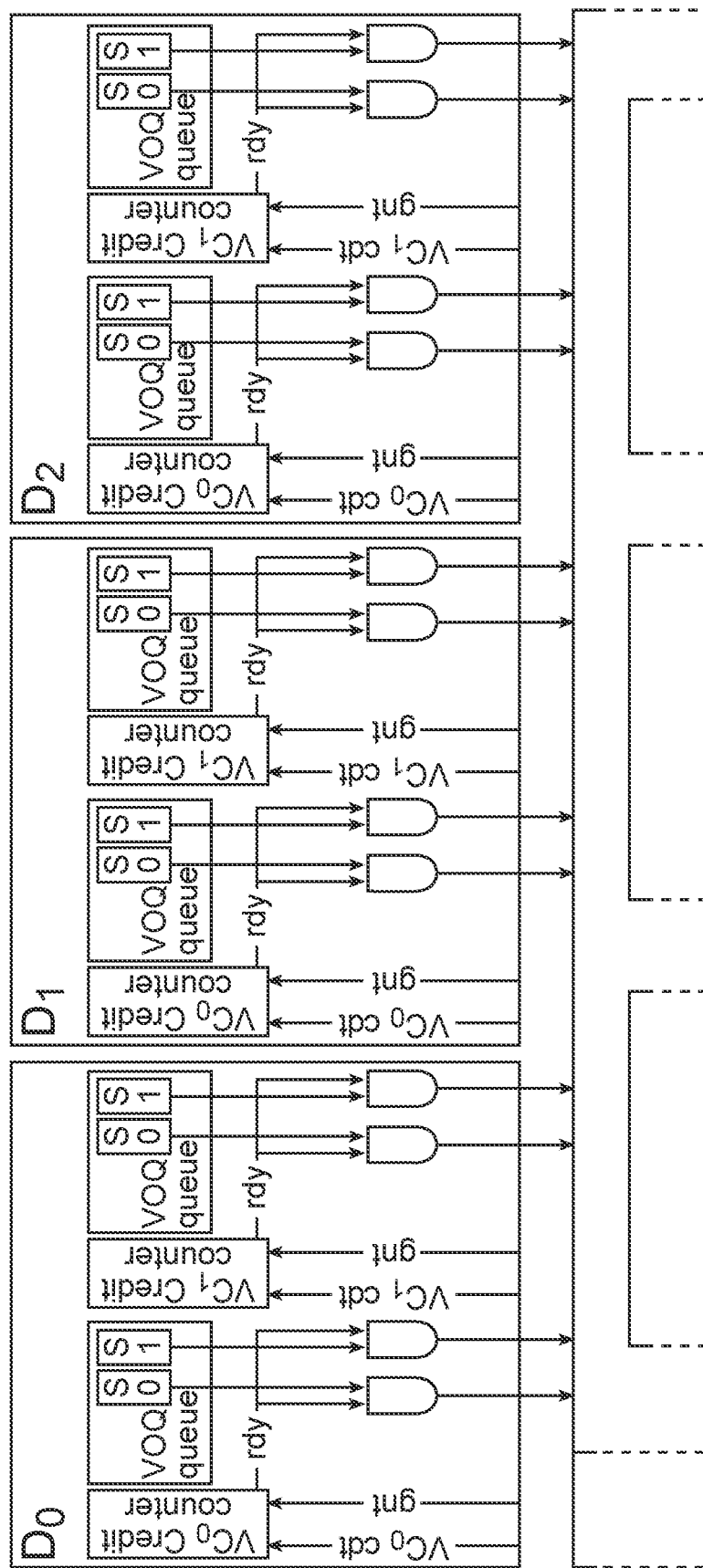

FIGS. 19A-19B, taken together, show the "credit at dispatch" crediting scheme with starvation free Rolling RR-LRU dispatch unit as described herein, (for a 2×3 switch with two virtual channels in FIG. 9). Thus FIGS. 19A-19B illustrate a "credit at dispatch" scheme with a Rolling RR-LRU dispatch unit which is a starvation free scheme.

The term "all" is used herein for simplicity, to describe example embodiments. It is appreciated however that alternatively, whatever is said herein to be true of or to characterize or to pertain to, "all" members of, or "each" member of, or "every" member of, a certain set can also, in other embodiments, be true of, or characterize or pertain to, most but not all members of that set, or all but a few members of that set, or at least one (but less than all) member/s of the set.

For example, a scheme may mask "all" requests, as described herein. But alternatively, most, but not all requests, or all, but a few requests, or multiple requests, but less than all, may be masked. To give another example, flow controls are used to prevent any packet drops within switches as described herein. But alternatively, flow controls may be used to prevent most, but not all packet drops within switches, or all, but a few packet drops within switches, or at least one (but less than all) packet drop/s within switches.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather the scope of the invention includes, inter alia, the appended claims and equivalents thereof.

The invention claimed is:

1. A switch comprising:
a plurality of input ports and a plurality of output ports;
a plurality of virtual channels, wherein only one of the plurality of virtual channels can, at a given time, access a given output port from among the plurality of output ports; and
an arbiter apparatus to ensure that at least one input port, from among the plurality of input ports, transmits at most one cell at a time, and that at least one output port, from among the plurality of output ports, which receives a cell, receives that cell over only one virtual channel (VC) from among the plurality of virtual channels, wherein the at least one output port, from among the plurality of output ports, receives at most one cell at a time.

2. The switch according to claim 1, wherein the arbiter apparatus comprises:
a first set of arbiters, which selects, for the at least one output port, at least one input port from among the plurality of input ports; and
a second set of arbiters, which selects, for each input port from among the plurality of input ports, at least one output port from among the plurality of output ports.

3. The switch according to claim 2, wherein the first set of arbiters comprises:
a subset of arbiters for each of the plurality of output ports to:
select, at least once, an input port from among the plurality of input ports which is requesting that output port as that input port's destination; and
select, at least once, a virtual channel from among the plurality of virtual channels which is requesting that output port as that virtual channel's destination.

4. The switch according to claim 3, wherein at least one subset of arbiters includes an arbiter per virtual channel, to define a destination virtual channel (DV) arbiter per virtual channel.

5. The switch according to claim 4, wherein the at least one subset of arbiters includes virtual channel select logic to select a DV arbiter from among a plurality of DV arbiters.

6. The switch according to claim 3, wherein a plurality of input port requests are all to a single virtual channel and whose destinations all comprise a single output port, connected to a single DV arbiter in a single subset of arbiters, or wherein the plurality of input port requests are to different virtual channels, whose destinations all comprise a single output port, connected to different DV arbiters in a single subset of arbiters.

7. The switch according to claim 4, wherein at least one DV arbiter uses an arbitration scheme to select among the plurality of input ports, and wherein the arbitration scheme used by the DV arbiter comprises a round robin scheme which uses circular priority to grant requests.

8. The switch according to claim 7, wherein the DV arbiter updates the circular priority only after receiving an accept, from the second set of arbiters through virtual channel select logic.

9. The switch according to claim 5, wherein the virtual channel select logic uses an arbitration scheme to select the DV arbiter to pass a granted input port, from among the plurality of input ports, to the second set of arbiters, from among the plurality of DV arbiters which each have a granted source.

10. The switch according to claim 9, wherein the arbitration scheme used by the virtual channel select logic comprises a round robin arbitration scheme.

11. The switch according to claim 5, wherein the DV arbiter selected by the virtual channel select logic generates a WRAP signal when all active input ports in the selected DV arbiter are granted before again granting an input port.

12. The switch according to claim 5, wherein once the virtual channel select logic has selected the DV arbiter, the virtual channel select logic moves to a new DV arbiter only after receiving a WRAP signal from the currently selected DV arbiter.

13. The switch according to claim 5, wherein the virtual channel select logic passes an accept to the selected DV arbiter, only when the second set of arbiters accepts a grant from the first set of arbiters.

14. The switch according to claim 2, wherein at least one arbiter in the second set of arbiters uses a priority scheme in which a request, which has a given priority, receives a grant before other requests, which have priorities lower than the given priority.

15. The switch according to claim 5, wherein the input queued switch uses credit-based flow control, whereby packets are transmitted to an output port, from among the plurality of output ports, only when buffer space is known to exist at a destination of the output port, to avoid packet drop.

16. The switch according to claim 15, further comprising:
a counter for every destination per virtual channel, wherein each counter keeps track of buffer space for each destination by decrementing an associated counter for every packet sent to a given destination and incrementing the associated counter for every credit returned from the given destination, and wherein credits are returned from a destination whenever a destination buffer associated with the destination is freed up.

17. The switch according to claim 16, wherein Virtual Output Queues store incoming packets, wherein each destination's counter generates a ready indication when a given destination and a given virtual channel have enough credit to accommodate a packet, and wherein, when the ready indication is asserted, requests to transmit packets through the input queued switch in all input ports' Virtual Output Queue of the given destination and virtual channel are exposed to a dispatch unit, else all requests to transmit packets through the input queued switch are masked, thereby to provide a "credit at dispatch" scheme of credit-based flow control.

18. The switch according to claim 14, wherein the priority scheme comprises a round robin scheme or a Least Recently Used (LRU) scheme in which at least one request, which received a grant less recently, has a higher priority relative to requests which received grants more recently.

19. A device comprising:
a plurality of virtual channels, wherein only one of the plurality of virtual channels can, at a given time, access a given output port from among a plurality of output ports of a switch; and
an arbiter apparatus enforcing that at least one input port, from among a plurality of input ports of the switch, transmits at most one cell at a time, and that at least one output port, from among the plurality of output ports, which receives a cell, receives that cell over only one virtual channel (VC) from among the plurality of virtual channels, wherein the at least one output port, from among the plurality of output ports, receives at most one cell at a time.

20. An arbiter apparatus comprising:
one or more processors to control:
that at least one input port, from among a plurality of input ports, transmits at most one cell at a time;
that at least one output port, from among a plurality of output ports, which receives a cell, receives that cell over only one virtual channel (VC) from among a plurality of virtual channels; and
that the at least one output port, from among the plurality of output ports, receives at most one cell at a time.

* * * * *